US011604295B2

(12) United States Patent
Takeda

(10) Patent No.: US 11,604,295 B2
(45) Date of Patent: Mar. 14, 2023

(54) DISPLAY SYSTEM, DISPLAY DEVICE, AND DISPLAY METHOD

(71) Applicant: SEIKO EPSON CORPORATION, Tokyo (JP)

(72) Inventor: Kazuyoshi Takeda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 588 days.

(21) Appl. No.: 16/667,589

(22) Filed: Oct. 29, 2019

(65) Prior Publication Data
US 2020/0132868 A1    Apr. 30, 2020

(30) Foreign Application Priority Data
Oct. 30, 2018  (JP) .............................. JP2018-203968

(51) Int. Cl.
| | | |
|---|---|---|
| *G01V 1/00* | (2006.01) | |
| *G01V 1/22* | (2006.01) | |
| *G01V 1/34* | (2006.01) | |
| *G06F 3/14* | (2006.01) | |

(52) U.S. Cl.
CPC ................ *G01V 1/008* (2013.01); *G01V 1/22* (2013.01); *G01V 1/34* (2013.01); *G06F 3/14* (2013.01)

(58) Field of Classification Search
USPC .......................................................... 702/15
See application file for complete search history.

(56) References Cited

U.S. PATENT DOCUMENTS

| | | | |
|---|---|---|---|
| 7,383,133 B1* | 6/2008 | Scott ...................... | G01V 1/008 361/24 |
| 2008/0234921 A1 | 9/2008 | Groenhuijzen et al. | |
| 2008/0270034 A1* | 10/2008 | Friedlander ............ | G01V 1/008 702/14 |
| 2019/0369274 A1* | 12/2019 | Choi ....................... | G01P 15/02 |

FOREIGN PATENT DOCUMENTS

| | | |
|---|---|---|
| JP | 2000-214267 | 8/2000 |
| JP | 2001-130848 | 5/2001 |
| JP | 2006-306577 | 11/2006 |
| JP | 2009-046248 | 3/2009 |
| JP | 2010-520993 | 6/2010 |
| JP | 2011-242246 | 12/2011 |
| JP | 2013-097417 | 5/2013 |
| JP | 2014-178226 | 9/2014 |
| JP | 2015-045616 | 3/2015 |
| JP | 2015-099468 | 5/2015 |

* cited by examiner

*Primary Examiner* — Paul D Lee
(74) *Attorney, Agent, or Firm* — Workman Nydegger

(57) ABSTRACT

In a display system, each of a plurality of sensor terminals estimates first information based on accumulated first measurement data and transmits the first information to a display device. The display device synchronizes a received plurality of kinds of the first information at time and classifies the plurality of kinds of first information into a plurality of first information groups, estimates, based on position information of the plurality of sensor terminals and the first information included in each of the first information groups, updates the first information group, generates, for each of the updated plurality of first information groups, based on map information including a region where a structure is located, image information including a distribution of values of the first information on a map, and displays an image based on the image information.

19 Claims, 16 Drawing Sheets

| DATA NUMBER | IDENTIFICATION CODE | POSITION | TIME | VALUE OF FIRST INFORMATION | |
|---|---|---|---|---|---|
| 1 | 1 | p1 | t1 | v1 | GROUP 1 |
| 2 | 2 | p2 | t1 | v0 | |
| 3 | 3 | p3 | t1 | v0 | |
| 4 | 4 | p4 | t1 | v0 | |
| 5 | 1 | p1 | t2 | v2 | GROUP 2 |
| 6 | 2 | p2 | t2 | v1 | |
| 7 | 3 | p3 | t2 | v0 | |
| 8 | 4 | p4 | t2 | v0 | |
| 9 | 1 | p1 | t3 | v3 | GROUP 3 |
| 10 | 2 | p2 | t3 | v2 | |
| 11 | 3 | p3 | t3 | v1 | |
| 12 | 4 | p4 | t3 | v0 | |
| 13 | 1 | p1 | t4 | v4 | GROUP 4 |
| 14 | 2 | p2 | t4 | v3 | |
| 15 | 3 | p3 | t4 | v2 | |
| 16 | 4 | p4 | t4 | v1 | |

DISPLAY SYSTEM, DISPLAY DEVICE, AND DISPLAY METHOD

The present application is based on, and claims priority from JP Application Serial Number 2018-203968, filed Oct. 30, 2018, the disclosure of which is hereby incorporated by reference herein in its entirety.

BACKGROUND

1. Technical Field

The present disclosure relates to a display system, a display device, and a display method.

2. Related Art

JP A-2006-306577 (Patent Literature 1) describes a device that predicts, based on earthquake information such as seismic center positions and distributions of tremors of earthquakes in the past and damage distribution information of elevators by earthquakes in the past, a damage distribution of elevators by an earthquake that has occurred anew.

JP A-2009-046248 (Patent Literature 2) describes a system that records, in an elevator control device, data of an acceleration sensor at time when an emergency earthquake news flash is received by a cellular phone terminal.

JP A-2001-130848 (Patent Literature 3) describes a system that records vibration waveform data from earthquake occurrence to an end with an earthquake sensor attached to an elevator hoistway and controls an operation mode of an elevator based on earthquake seismic intensity measured by a vibration waveform of the vibration waveform data.

However, all of the device and the systems described in Patent Literatures 1 to 3 are limited to control of individual elevators and a damage prediction at the time when an earthquake occurs. The device and the systems cannot sufficiently observe, concerning vibration of entire structures such as buildings and the influence of the vibration on the structures, situations of regions where the structures are located.

SUMMARY

A display system according to an aspect of the present disclosure includes: a plurality of sensor terminals provided in at least one structure; and a display device. Each of the plurality of sensor terminals includes: a first sensor configured to measure a physical quantity generated by vibration and output first measurement data; a storage configured to store the first measurement data; a first information estimator configured to estimate first information based on the first measurement data accumulated in the storage; a time-information acquirer configured to acquire time information; and a transmitter configured to transmit the first information added with the time information to the display device. The display device includes: a receiver configured to receive the first information from each of the plurality of sensor terminals; a time synchronizer configured to synchronize a received plurality of kinds of the first information at time and classify the plurality of kinds of first information into a plurality of first information groups; a position-information acquirer configured to acquire position information of the plurality of sensor terminals; a map information acquirer configured to acquire map information including a region where the structure is located; a first information updater configured to estimate, for each of the plurality of first information groups, based on the position information and the first information included in the first information group, the first information in a position different from positions of the plurality of sensor terminals and add the estimated first information to update the first information group; an image information generator configured to generate, for each of the updated plurality of first information groups, based on the map information, image information including a distribution of values of the first information on a map; and a display configured to display an image based on the image information.

In the display system according to the aspect, the transmitter may transmit the position information to the display device.

In the display system according to the aspect, the first sensor may be an acceleration sensor.

In the display system according to the aspect, each of the plurality of sensor terminals may include a second sensor configured to measure a physical quantity generated by vibration and output second measurement data, the second sensor may be an angular velocity sensor, the storage may accumulate the second measurement data, and the first information estimator may estimate the first information based on the accumulated first measurement data and the accumulated second measurement data.

In the display system according to the aspect, the image may be a moving image or a still image at designated time.

In the display system according to the aspect, at least one of the plurality of sensor terminals may be provided at a ground surface or under a ground, the first information updater may estimate, for each of the plurality of first information groups, seismic intensity at the ground surface based on the position information of the sensor terminal provided at the ground surface or under the ground and the first information transmitted from the sensor terminal and add information concerning the estimated seismic intensity to update the first information group, and the image information generator may generate, for each of the updated plurality of first information groups, the image information including a distribution of values of the first information and a propagation state of the seismic intensity at the ground surface.

In the display system according to the aspect, at least one of the plurality of sensor terminals may be provided at a ground surface or under a ground, the first information may include information concerning seismic intensity, the first information updater may estimate, for each of the plurality of first information groups, seismic intensity at the ground surface or under the ground based on the position information of the sensor terminal provided at the ground surface or under the ground and the first information transmitted from the sensor terminal and add information concerning the estimated seismic intensity to update the first information group, and the image-information generator may generate, for each of the updated plurality of first information groups, the image information including a propagation state of the seismic intensity at the ground surface or under the ground as a distribution of values of the first information.

In the display system according to the aspect, the first information updater may estimate, for each of the plurality of first information groups, based on the position information, the first information included in the first information group, and seismic intensity measured by a seismometer, the first information in a position different from positions of the plurality of sensor terminals.

A display device according to an aspect of the present disclosure includes: an image information generator configured to generate, based on first information based on a physical quantity generated by vibration transmitted from each of a plurality of sensor terminals provided in at least one structure, image information including a distribution of values of the first information on a map; and a display configured to display an image based on the image information.

In the display device according to the aspect, the image may be a moving image or a still image at designated time.

In the display device according to the aspect, at least one of the plurality of sensor terminals may be provided at a ground surface or under a ground, and the image information generator may generate the image information including the distribution of the values of the first information and a propagation state of seismic intensity at a ground surface.

In the display device according to the aspect, at least one of the plurality of sensor terminals may be provided at a ground surface or under a ground, the first information may include information concerning seismic intensity, and the image information generator may generate the image information including a propagation state of seismic intensity at a ground surface or under a ground as the distribution of the values of the first information.

In the display device according to the aspect, the image information generator may generate the image information based on the first information and seismic intensity measured by a seismometer.

A display method according to an aspect of the present disclosure includes: an image-information generating step of generating, based on first information based on a physical quantity generated by vibration transmitted from each of a plurality of sensor terminals provided in a structure, image information including a distribution of values of the first information on a map; and a displaying step of displaying an image based on the image information.

In the display method according to the aspect, the image may be a moving image or a still image at designated time.

In the display method according to the aspect, at least one of the plurality of sensor terminals may be provided at a ground surface or under a ground, and, in the image-information generating step, the image information including the distribution of the values of the first information and a propagation state of seismic intensity at a ground surface may be generated.

In the display method according to the aspect, at least one of the plurality of sensor terminals may be provided at a ground surface or under a ground, the first information may include information concerning seismic intensity, and, in the image-information generating step, the image information including a propagation state of the seismic intensity at the ground surface or under the ground as the distribution of the values of the first information may be generated.

In the display method according to the aspect, in the image-information generating step, the image information may be generated based on the first information and seismic intensity measured by a seismometer.

DESCRIPTION OF EXEMPLARY EMBODIMENTS

Preferred embodiments of the present disclosure are explained in detail below with reference to the drawings. The embodiments explained below do not unduly limit the content of the present disclosure described in the appended claims. Not all of components explained below are essential constituent elements of the present disclosure.

1. First Embodiment 1-1. Configuration of a Display System

Figure 1:
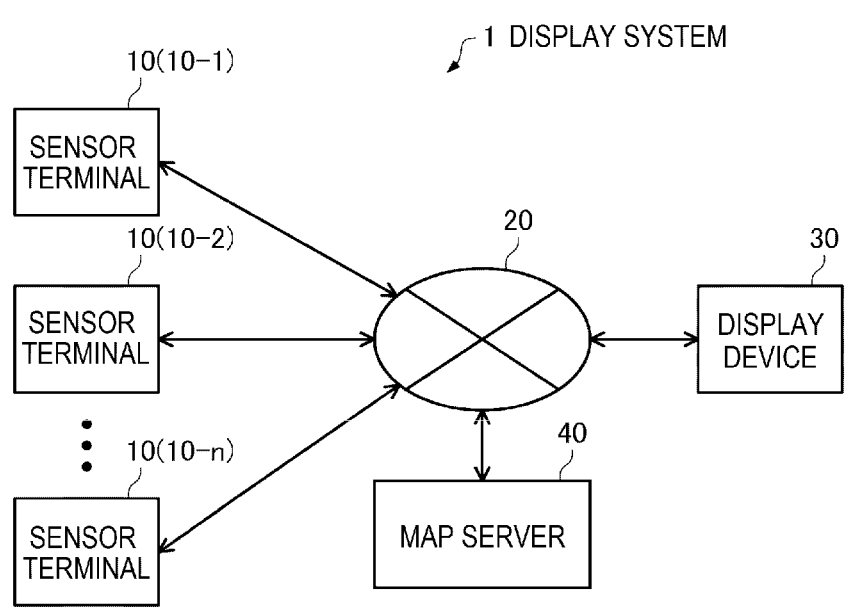
FIG. 1 is a diagram showing the configuration of a display system in a first embodiment.

FIG. 1 is a diagram showing the configuration of a display system 1 in a first embodiment. As shown in FIG. 1, the display system 1 in this embodiment includes a plurality of sensor terminals 10 and a display device 30. The display system 1 in this embodiment may include a map server 40. In the following explanation, the number of the sensor terminals 10 is n. When the n sensor terminals 10 are distinguished, the n sensor terminals 10 are respectively described as sensor terminals 10-1, 10-2, and 10-*n*. Note that n is an integer equal to or larger than 2.

As shown in FIG. 1, in the display system 1, the n sensor terminals 10 and the display device 30 communicate via a communication network 20. The communication network 20 may be a public line such as the Internet. The n sensor terminals 10 may be coupled to one another by a wireless LAN (Local Area Network) and may be coupled to the communication network 20 through a not-shown access point. Examples of a communication standard of the wireless LAN include an IEEE802.11 series.

Each of the n sensor terminals 10 is provided in at least one structure. For example, at least one sensor terminal 10 may be provided in a first structure and another at least one sensor terminal 10 may be provided in a second structure different from the first structure. Further, each of the n sensor terminals 10 may be provided in one structure.

For example, a plurality of sensor terminals 10 may be provided in positions at heights different from one another of the first structure. Another plurality of sensor terminals 10 may be provided in positions at heights different from one another of the second structure different from the first structure. At least one of the n sensor terminals 10 may be provided at the ground surface or under the ground.

With the display system 1 in this embodiment, a user can observe, for one structure, vibration of the entire structure and the influence of the vibration on the structure taking into account a situation of a region where the structure is located. Further, as explained below with reference to FIGS. 11 to 14, with the display system 1 in this embodiment, the user can observe, for a plurality of structures, vibration of the entire structures and the influence of the vibration on the structures overlooking situations of regions where the plurality of structures are located.

First, to facilitate understanding of the present disclosure, the display system 1 is explained in detail focusing on one structure.

Figure 2:
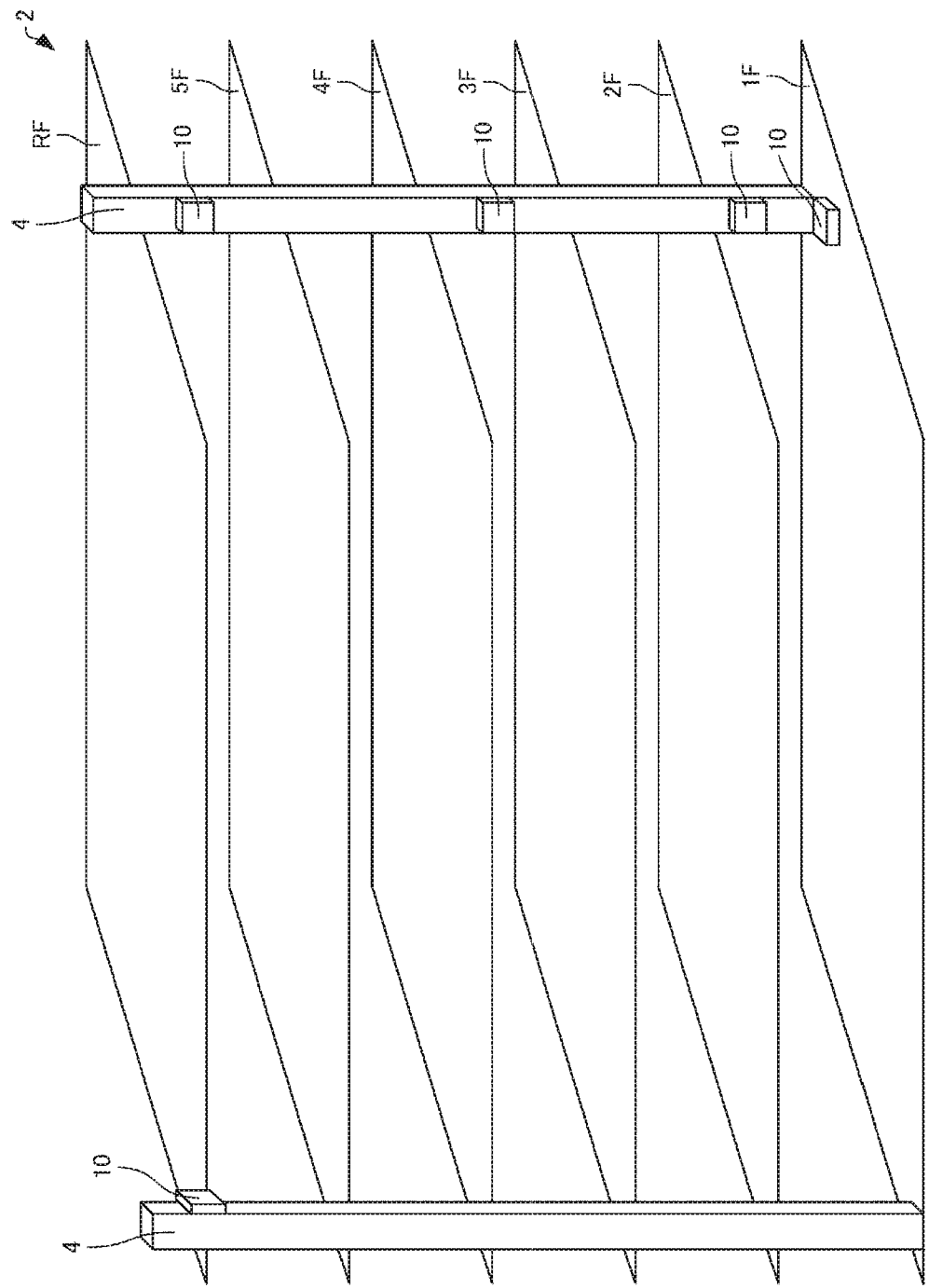
FIG. 2 is a diagram showing an example of a state in which a plurality of sensor terminals are attached to a building.

FIG. 2 is a diagram showing an example of a state in which a plurality of sensor terminals 10 are attached to a building. In the example shown in FIG. 2, a building 2 is a five-story building including floors 1F to 5F, a roof RF, and steel columns 4. The plurality of sensor terminals 10 are attached to the building 2. Specifically, four sensor terminals 10 are respectively attached to the steel columns 4 in four places between the floor 1F and the floor 2F, between the floor 3F and the floor 4F, between the floor 5F and the roof RF, and on the roof RF. One sensor terminal 10 is attached to the floor 1F. In this way, five sensor terminals 10 are provided in positions at heights different from one another of the building 2.

Referring back to FIG. 1, each of the n sensor terminals 10 measures a physical quantity generated by vibration of the structure and acquires first measurement data. Each of the n sensor terminals 10 estimates first information based on the first measurement data and transmits the estimated first information to the display device 30 via the communication network 20. The first information may include information of seismic intensity of an earthquake or may include various kinds of information related to the vibration of the structure, for example, information such as a frequency characteristic of the vibration of the structure, interlayer displacement and an interlayer deformation angle, and distortion and a fatigue degree of the structure. An identification code of the sensor terminal 10 is also added to the first information.

The display device 30 receives the first information from each of the n sensor terminals 10 via the communication network 20. The display device 30 acquires, via the communication network 20, from the map server 40, map information including a region where the structure in which the n sensor terminals 10 are provided is located. The display device 30 generates, based on the first information and the map information, image information including a distribution of values of the first information on a map and displays an image based on the generated image information on a not-shown display.

Figure 3:
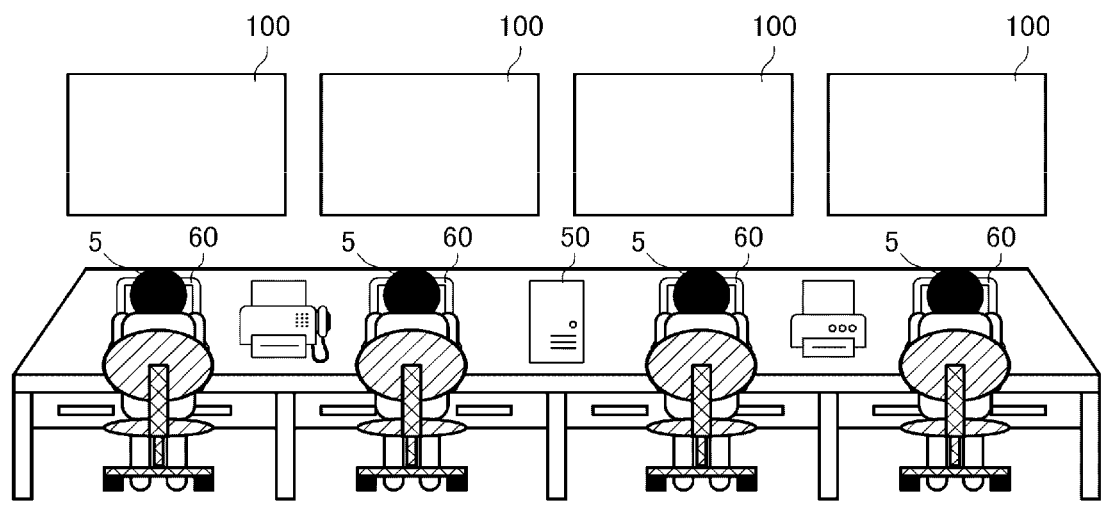
FIG. 3 is a diagram showing a setting example of a display device.

FIG. 3 is a diagram showing a setting example of the display device 30. In the example shown in FIG. 3, the display device 30 is configured by a server 50 set in a monitoring center and a monitor 100 functioning as a display. Alternatively, the display device 30 is a personal computer 60 used by a user 5, who is a surveillant. That is, in the example shown in FIG. 3, image information including a distribution of values of the first information on the map is generated in the server 50 or the personal computer 60. An image based on the image information is displayed on the monitor 100 or a display of the personal computer 60. The user 5 can monitor the image and grasp a situation of the region where the structure in which the sensor terminal 10 is provided is located, for example, influence due to occurrence of an earthquake.

1-2. Configurations of the Sensor Terminal and the Display Device

Figure 4:
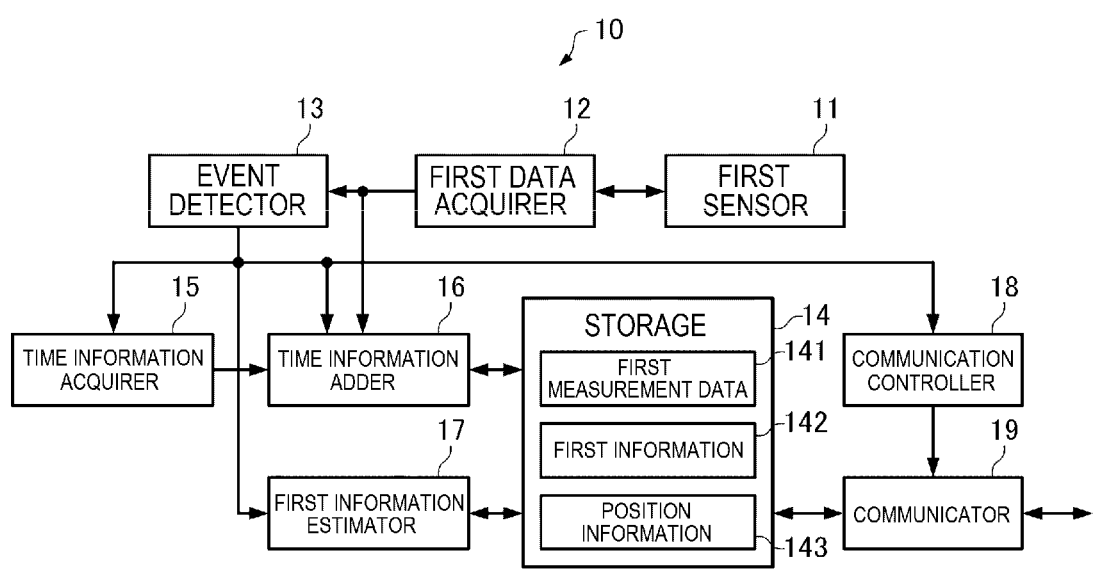
FIG. 4 is a diagram showing an example of functional blocks of the sensor terminal.

FIG. 4 is a diagram showing an example of functional blocks of the sensor terminal 10 in the first embodiment. As shown in FIG. 4, the sensor terminal 10 includes a first sensor 11, a first data acquirer 12, an event detector 13, a storage 14, a time information acquirer 15, a time information adder 16, a first information estimator 17, a communication controller 18, and a communicator 19.

The first sensor 11 measures a physical quantity generated by vibration of the structure in which the sensor terminal 10 is provided and outputs first measurement data. For example, the first sensor 11 may be an acceleration sensor that measures acceleration as the physical quantity generated by the vibration. For example, the first sensor 11 may be an angular velocity sensor that measures angular velocity as the physical quantity generated by the vibration.

The first data acquirer 12 periodically acquires the first measurement data from the first sensor 11 and outputs the first measurement data to the event detector 13.

The event detector 13 generates an event signal when an amount of change of the first measurement data in a predetermined period exceeds a predetermined threshold. When large vibration is suddenly applied to the first sensor 11, for example, when an earthquake occurs, the first measurement data suddenly changes and the event detector 13 generates the event signal. The event detector 13 may generate the event signal when large vibration is detected by a mechanism different from the first sensor 11 or may generate the event signal based on a signal input from the outside of the sensor terminal 10 in association with the large vibration. The time information acquirer 15, the time information adder 16, the first information estimator 17, and the communication controller 18 start operation according to the event signal generated by the event detector 13. The first data acquirer 12 continues the acquisition of the first measurement data even after the event signal is generated.

The time information acquirer 15 acquires time information. Specifically, the time information acquirer 15 acquires the time information at a predetermined interval after the generation of the event signal. The time information acquirer 15 may be, for example, a GPS (Global Positioning System) receiver. For example, the time information may be a value of a not-shown timer that operates based on an output signal of a not-shown oscillator included in the sensor terminal 10. In this case, a mechanism for synchronizing time among the n sensor terminals 10, for example, a mechanism for supplying a common synchronization signal to the n sensor terminals 10 only has to be provided.

After the generation of the event signal, the time information adder 16 adds the time information acquired by the time information acquirer 15 to the first measurement data acquired by the first data acquirer 12 and causes the storage 14 to sequentially store first measurement data 141 added with the time information. Consequently, the storage 14 accumulates the first measurement data 141 added with the time information.

After the generation of the event signal, the first time estimator 17 estimates first information based on the first measurement data 141 accumulated in the storage 14 and causes the storage 14 to store estimated first information 142. Consequently, the storage 14 accumulates the first information 142 added with the time information. As explained above, the first information includes, for example, information concerning seismic intensity of an earthquake and various kinds of information related to vibration of the structure. The first information estimator 17 can estimate the first information according to a publicly-known method.

The storage 14 stores position information 143 of the sensor terminal 10 in addition to the first measurement data 141 and the first information 142. The position information 143 is, for example, information concerning the latitude and the longitude of a position where the sensor terminal 10 is set.

The communication controller 18 controls the operation of the communicator 19. Specifically, after the generation of the event signal, the communication controller 18 controls the communicator 19 to transmit the first information 142 added with the time information to the display device 30.

The communicator 19 performs communication with the display device 30 according to the control by the communication controller 18. In particular, in this embodiment, the communicator 19 functions as a transmitter that, after the generation of the event signal, adds an identification code of the sensor terminal 10 to the first information 142 added with the time information stored in the storage 14 and transmits the first information 142 added with the identification code to the display device 30. After the generation of the event signal, the communicator 19 transmits the position information 143 stored in the storage 14 to the display device 30.

In order to reduce a consumed current, the time information acquirer 15, the time information adder 16, the first information estimator 17, and the communication controller 18 may stop the operation assuming that a measurement period ends when a time sufficient for the vibration to stop, for example, several minutes elapse. Alternatively, the time information acquirer 15, the time information adder 16, the first information estimator 17, and the communication controller 18 may stop the operation assuming that the measurement period ends when the event detector 13 detects that the amount of change of the first measurement data is smaller than the predetermined threshold continuously for the predetermined time.

Figures 5, 6:
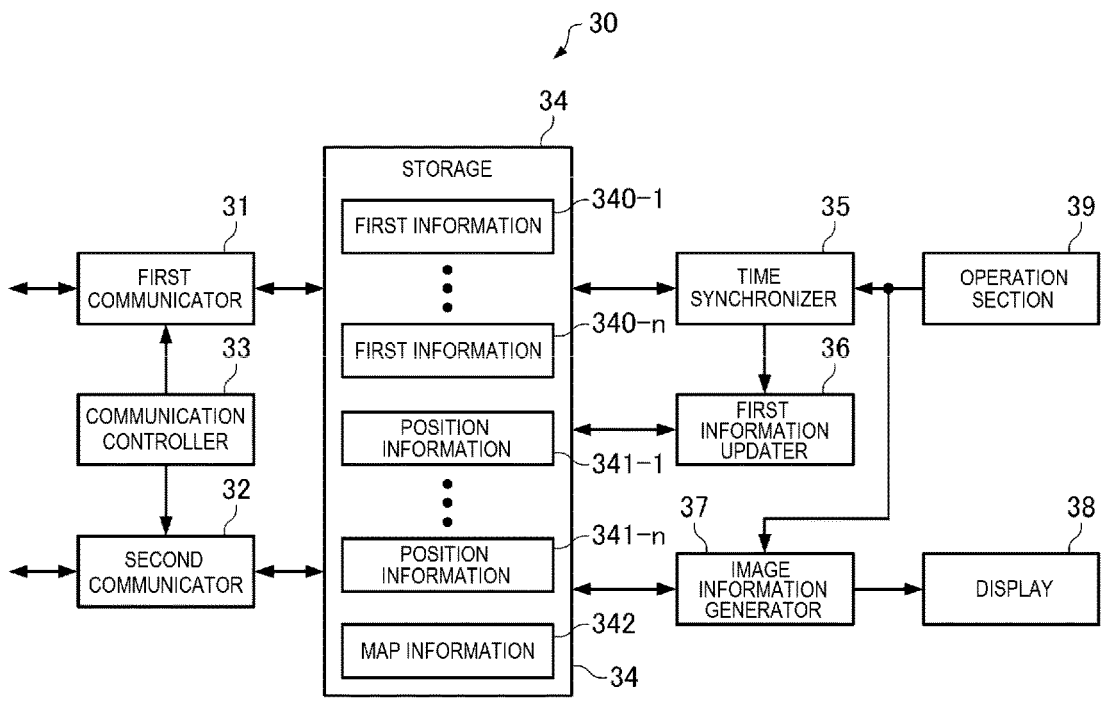
FIG. 5 is a diagram showing an example of a functional blocks of the display device.
FIG. 6 is a diagram for explaining processing of a time synchronizer.

FIG. 5 is a diagram showing an example of functional blocks of the display device 30 in the first embodiment. As shown in FIG. 5, the display device 30 includes a first communicator 31, a second communicator 32, a communication controller 33, a storage 34, a time synchronizer 35, a first information updater 36, an image information generator 37, a display 38, and an operation section 39.

The communication controller 33 controls the operation of the first communicator 31 and the operation of the second communicator 32. Specifically, the communication controller 33 controls the first communicator 31 to receive first information added with time information and position information from each of the n sensor terminals 10. The communication controller 33 controls the second communicator 32 to receive, from the map server 40, map information including the region where the structure in which the n sensor terminals 10 are provided is located.

The first communicator 31 performs communication with the n sensor terminals 10 according to the control by the communication controller 33. In particular, in this embodiment, the first communicator 31 functions as a receiver that receives first information 340-1 to 340-$n$ added with time information respectively from the sensor terminals 10-1 to 10-$n$ and causes the storage 34 to store the first information 340-1 to 340-$n$. The first communicator 31 functions as a position information acquirer that acquires position information 341-1 to 341-$n$ respectively from the sensor terminals 10-1 to 10-$n$ and causes the storage 34 to store the position information 341-1 to 341-$n$.

The second communicator 32 performs communication with the map server 40 according to the control by the communication controller 33. In particular, in this embodiment, the second communicator 32 functions as a map information acquirer that acquires, from the map server 40, map information 342 including the region where the structure in which the n sensor terminals 10 are provided is located and causes the storage 34 to store the map information 342.

The operation section 39 is a device to which an operation signal by the user is input. The operation section 39 is realized by a keyboard, buttons displayed on a touch panel, or the like.

The time synchronizer 35 synchronizes the first information 340-1 to 340-$n$, which the first communicator 31 receives and causes the storage 34 to store, at time and classifies the first information 340-1 to 340-$n$ into a plurality of first information groups. For example, it is assumed that n kinds of the first information 340-1 to 340-$n$ added with time t1, n kinds of the first information 340-1 to 340-$n$ added with time t2, . . . , and n kinds of the first information 340-1 to 340-$n$ added with time tN are stored in the storage 34. In this case, the time synchronizer 35 groups, for integers k of 1 to N, n kinds of the first information 340-1 to 340-$n$ added with time tk into one first information group to thereby classify the first information 340-1 to 340-$n$ stored in the storage 34 into N first information groups. That is, the time synchronizer 35 groups the first information added with the same time into one first information group. The time synchronizer 35 may perform the processing explained above when an operation signal for instructing image display is input from the operation section 39.

FIG. 6 is a diagram for explaining the processing of the time synchronizer 35. In FIG. 6, an example of the first information and the position information stored in the storage 34 is converted into a table format and illustrated. In the example shown in FIG. 6, as indicated by data numbers 1 to 4, four kinds of first information added with time information indicating the time t1 respectively transmitted from four sensor terminals 10-1 to 10-4 respectively having identification codes 1 to 4 are stored in the storage 34. As indicated by data numbers 5 to 8, four kinds of first information added with time information indicating the time t2 respectively transmitted from the four sensor terminals 10-1 to 10-4 are stored in the storage 34. As indicated by data numbers 9 to 12, four kinds of first information added with time information indicating time t3 respectively transmitted from the four sensor terminals 10-1 to 10-4 are stored in the storage 34. As indicated by data numbers 13 to 16, four kinds of first information added with time information indicating time t4 respectively transmitted from the four sensor terminals 10-1 to 10-4 are stored in the storage 34. The four kinds of first information indicated by the data number 1, 5, 9, and 13 are respectively equivalent to the first information 340-1. The four kinds of first information indicated by the data numbers 2, 6, 10, and 14 are respectively equivalent to the first information 340-2. The four kinds of first information indicated by the data numbers 3, 7, 11, and 15 are respectively equivalent to the first information 340-3. The four kinds of first information indicated by the data numbers 4, 8, 12, and 16 are respectively equivalent to the first information 340-4. Position information 341-1, 341-2, 341-3, and 341-4 respectively indicating respective positions p1, p2, p3, and p4 of the four sensor terminals 10-1 to 10-4 respectively having the identification codes 1 to 4 is stored in the storage 34.

The time synchronizer 35 groups the first information having the data numbers 1 to 4 added with the time information indicating the same time t1 into one first information group indicated by a group 1. The time synchronizer 35 groups the first information having the data numbers 5 to 8 added with the time information indicating the same time t2 into one first information group indicated by a group 2. The time synchronizer 35 groups the first information having the data numbers 9 to 12 added with the time information indicating the same time t3 into one first information group indicated by a group 3. The time synchronizer 35 groups the first information having the data numbers 13 to 16 added with the time information indicating the same time t4 into one first information group indicated by a group 4. That is, in the example shown in FIG. 6, the time synchronizer 35 classifies, based on the time information, the first information into four first information groups of the group 1 to the group 4.

Referring back to FIG. 5, the first information updater 36 estimates, for each of a plurality of first information groups classified by the time synchronizer 35, based on the position information 341-1 to 341-$n$ stored in the storage 34 and the first information included in the first information group, first information in a position different from the positions of the n sensor terminals 10 and adds the estimated first information to update the first information group.

For example, when the first information group includes the first information 340-1 to 340-$n$ added with the time tk, the first information updater 36 may estimate, with linear interpolation, first information at the time tk in a position p different from the positions of the sensor terminals 10-1 to 10-$n$ using the first information 340-1 to 340-$n$ added with the time tk, the position information 341-1 to 341-$n$, and position information of the position p. Alternatively, the first information update 36 may estimate first information at the time tk in the position p taking into account information concerning geological features and topography of the region where the structure in which the sensor terminals 10-1 to 10-$n$ are provided is located. The position p different from the positions of the n sensor terminals 10, that is, a position where the first information updater 36 estimates first information is determined as appropriate according to, for example, a use of an image displayed by the display device 30.

Figure 7:
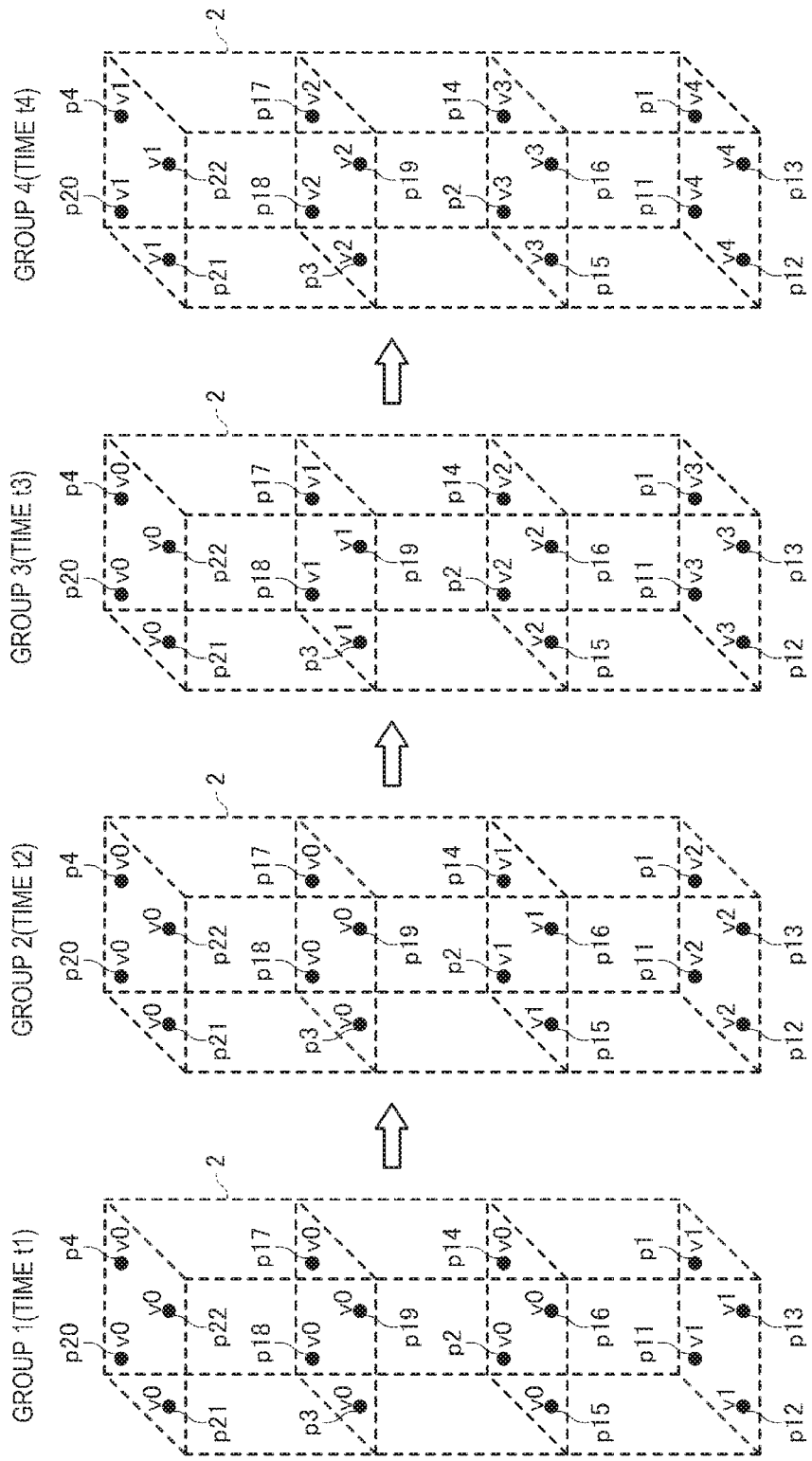
FIG. 7 is a diagram for explaining processing of a first information updater.

FIG. 7 is a diagram for explaining the processing of the first information updater 36 for the first information and the position information shown in FIG. 6. In an example shown in FIG. 7, it is assumed that the four sensor terminals 10-1 to 10-4 are provided in the position p1, p2, p3, and p4 at different heights in the building 2.

As shown in FIG. 7, the first information updater 36 estimates, for the first information group of the group 1, based on the position p1, p2, p3, and p4 of the four sensor terminals 10-1 to 10-4 and values v1, v0, v0, and v0 of the four kinds of first information included in the first information group, values of first information in twelve positions p11 to p22 different from the positions p1, p2, p3, and p4 of the four sensor terminals 10-1 to 10-4. As a result, at the time t1, the first information in three positions p11 to p13 has the same value v1 as the first information in the position p1 and the first information in nine positions p14 to p22 has the same value v0 as the first information in the positions p2, p3, and p4. The first information updater 36 adds the estimated first information in the twelve positions p11 to p22 to the first information group of the group 1 to update the first information group.

Similarly, the first information updater 36 estimates, for the first information group of the group 2, based on the positions p1, p2, p3, and p4 and values v2, v1, v0, and v0 of the four kinds of first information included in the first information group, values of the first information in the twelve positions p11 to p22. As a result, at the time t2, the first information in the three positions p11 to p13 has the same value v2 as the first information in the position p1, the first information in three positions p14 to p16 has the same value v1 as the first information in the position p2, and the first information in six positions p17 to p22 has the same value v0 as the first information in the positions p3 and p4. The first information updater 36 adds the estimated first information in the twelve positions p11 to p22 to the first information group of the group 2 to update the first information group.

Similarly, the first information updater 36 estimates, for the first information group of the group 3, based on the positions p1, p2, p3, and p4 and values v3, v2, v1, and v0 of the four kinds of first information included in the first information group, values of the first information in the twelve positions p11 to p22. As a result, at the time t3, the first information in the three positions p11 to p13 has the same value v3 as the first information in the position p1, the first information in the three positions p14 to p16 has the same value v2 as the first information in the position p2, the first information in three positions p17 to p19 has the same value v1 as the first information in the position p3 and the first information in three positions p20 to p22 has the same value v0 as the first information in the position p4. The first information updater 36 adds the estimated first information in the twelve positions p11 to p22 to the first information group of the group 3 to update the first information group.

Similarly, the first information updater 36 estimates, for the first information group of the group 4, based on the positions p1, p2, p3, and p4 and values v4, v3, v2, and v1 of the four kinds of first information included in the first information group, values of the first information in the twelve positions p11 to p22. As a result, at the time t4, the first information in the three positions p11 to p13 has the same value v4 as the first information in the position p1, the first information in the three positions p14 to p16 has the same value v3 as the first information in the position p2, the first information in the three positions p17 to p19 has the same value v2 as the first information in the position p3, and the first information in three positions p20 to p22 has the same value v1 as the first information in the position p4. The first information updater 36 adds the estimated first information in the twelve positions p11 to p22 to the first information group of the group 4 to update the first information group.

For each of the plurality of first information groups, the first information updater 36 may estimate seismic intensity at the ground surface or estimate seismic intensity at the ground surface or under the ground based on position information of the sensor terminal 10 provided at the ground surface or under the ground and first information transmitted from the sensor terminal 10 and add information concerning the estimated seismic intensity to update the first information group. For example, the first information updater 36 may estimate seismic intensity at the ground surface or under the ground with linear interpolation using position information of the sensor terminal 10 provided at the ground surface or under the ground and first information including information concerning seismic intensity of the position. Alternatively, the first information updater 36 may estimate seismic intensity at the ground surface or under the ground taking into account information concerning geological features and topography of the region where the structure in which the sensor terminal 10 is provided is located.

The image information generator 37 generates, for each of the plurality of first information groups updated by the first information updater 36, based on the map information 342 stored in the storage 34, image information including a distribution of values of the first information on the map. For example, the image information generator 37 may generate, for each of the plurality of first information groups, image information obtained by adding line segments, which connect positions having the same values of the first information, to a map image. The image information generator 37 may change, according to an operation signal input from the operation section 39, a type of image information to be generated.

The display 38 displays an image based on the image information generated by the image information generator 37. The image displayed on the display 38 may be a moving image or a still image at designated time.

Figure 8:
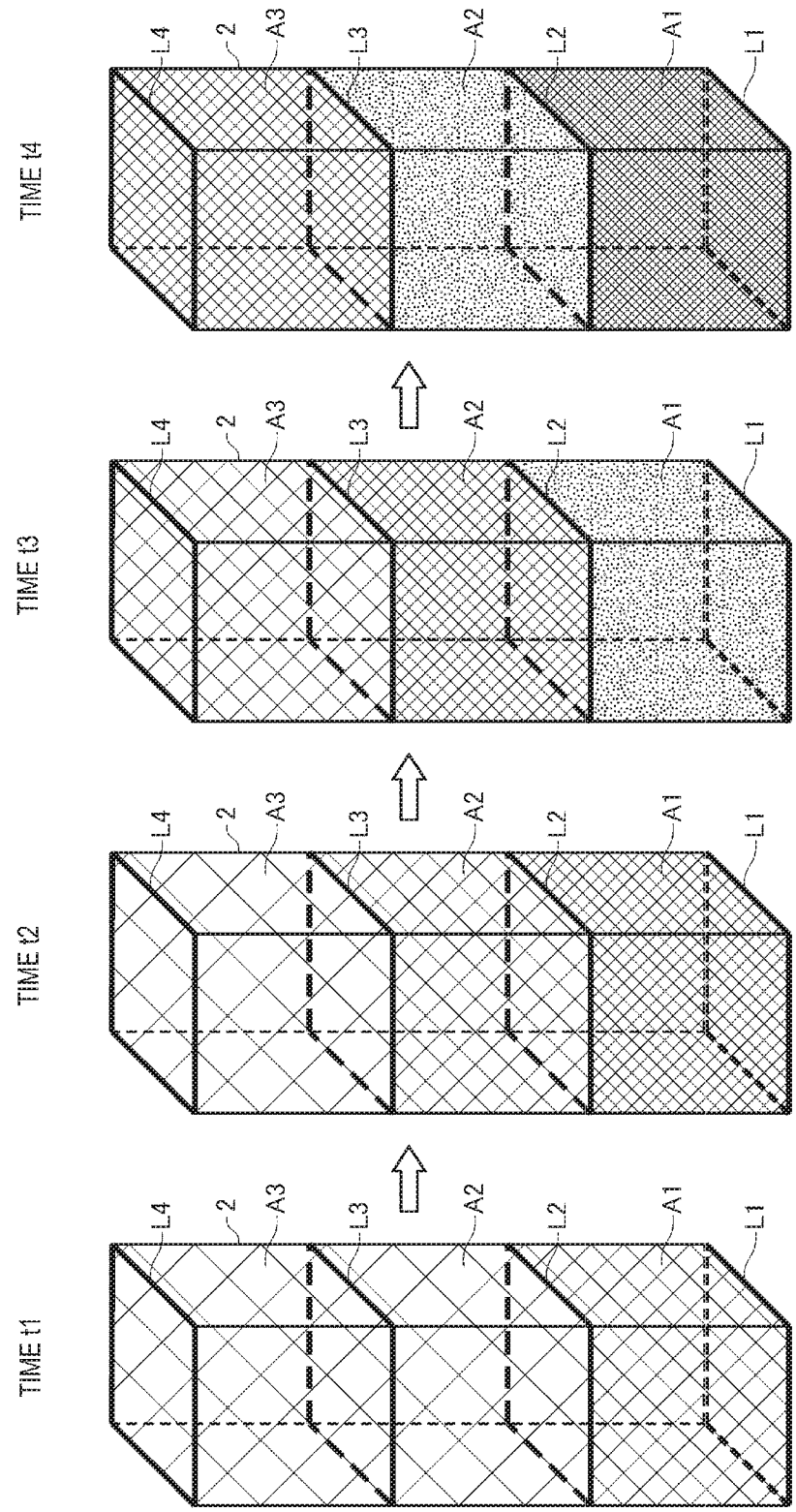
FIG. 8 is a diagram showing an example of an image displayed on a display.

FIG. 8 is a diagram showing an example of the image displayed on the display 38. The image shown in FIG. 8 is an image generated based on the four first information groups of the group 1 to the group 4 for which the processing explained with reference to FIG. 7 is performed.

In the example shown in FIG. 8, an image at the time t1 is an image based on the first information group of the group 1. Line segments indicated by L1 to L4 are added to the building 2. A region A2 between the line segment L2 and the line segment L3 and a region A3 between the line segment L3 and the line segment L4 are colored in a first color. A region A1 between the line segment L1 and the line segment L2 is colored in a second color darker than the first color. Such color coding indicates that a value v1 of the first information in the region A1 is larger than a value v0 of the first information in the regions A2 and A3.

Similarly, an image at the time t2 is an image based on the first information group of the group 2. The region A3 between the line segment L3 and the line segment L4 is colored in the first color. The region A2 between the line segment L2 and the line segment L3 is colored in the second color. The region A1 between the line segment L1 and the line segment L2 is colored in a third color darker than the second color. Such color coding indicates that a value v2 of the first information in the region A1 is larger than the value v1 of the first information in the region A2 and the value v1 of the first information in the region A2 is larger than the value v0 of the first information in the region A3.

Similarly, an image at the time t3 is an image based on the first information group of the group 3. The region A3 between the line segment L3 and the line segment L4 is colored in the second color. The region A2 between the line segment L2 and the line segment L3 is colored in the third color. The region A1 between the line segment L1 and the line segment L2 is colored in a fourth color darker than the third color. Such color coding indicates that a value v3 of the first information in the region A1 is larger than the value v2 of the first information in the region A2 and the value v2 of the first information in the region A2 is larger than the value v1 of the first information in the region A3.

Similarly, an image at the time t4 is an image based on the first information group of the group 4. The region A3 between the line segment L3 and the line segment L4 is colored in the third color. The region A2 between the line segment L2 and the line segment L3 is colored in the fourth color. The region A1 between the line segment L1 and the line segment L2 is colored in a fifth color darker than the fourth color. Such color coding indicates that a value v4 of the first information in the region A1 is larger than the value v3 of the first information in the region A2 and the value v3 of the first information in the region A2 is larger than the value v2 of the first information in the region A3.

The image information generator 37 may generate, for each of the plurality of first information groups added with the information concerning the seismic intensity at the ground surface and updated by the first information updater 36, image information including a distribution of values of the first information and a propagation state of the seismic intensity at the ground surface. Alternatively, the image information generator 37 may generate, for each of the plurality of first information groups added with the information concerning the seismic intensity at the ground surface or under the ground and updated by the first information updater 36, image information including a propagation state of the seismic intensity at the ground surface or under the ground as a distribution of values of the first information.

1-3. Flowchart

Figure 9:
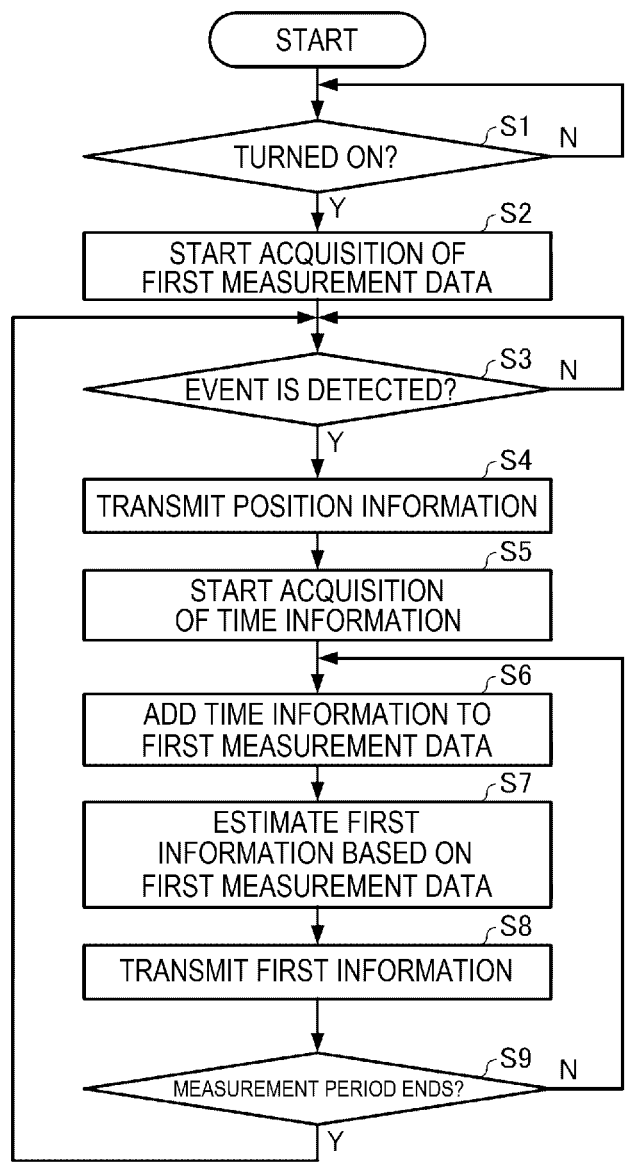
FIG. 9 is a flowchart showing an example of a procedure of the operation of the sensor terminal.

FIG. 9 is a flowchart showing an example of a procedure of the operation of the sensor terminal 10. In the flowchart of FIG. 9, the order of steps may be changed or steps may be added as appropriate.

In the example shown in FIG. 9, when the sensor terminal 10 is turned on (Y in step S1), the sensor terminal 10 starts acquisition of first measurement data (step S2).

Subsequently, when detecting an event (Y in step S3), the sensor terminal 10 transmits position information to the display device 30 (step S4).

Subsequently, the sensor terminal 10 starts acquisition of time information (step S5).

Subsequently, the sensor terminal 10 adds the time information to the acquired first measurement data (step S6).

Subsequently, the sensor terminal 10 estimates first information based on the first measurement data (step S7).

Subsequently, the sensor terminal 10 transmits the first information to the display device 30 (step S8).

The sensor terminal 10 repeatedly performs the processing in step S6 and subsequent steps until a measurement period ends (N in step S9). When the measurement period ends (Y in step S9), the sensor terminal 10 performs the processing in step S3 and subsequent steps again.

Figure 10:
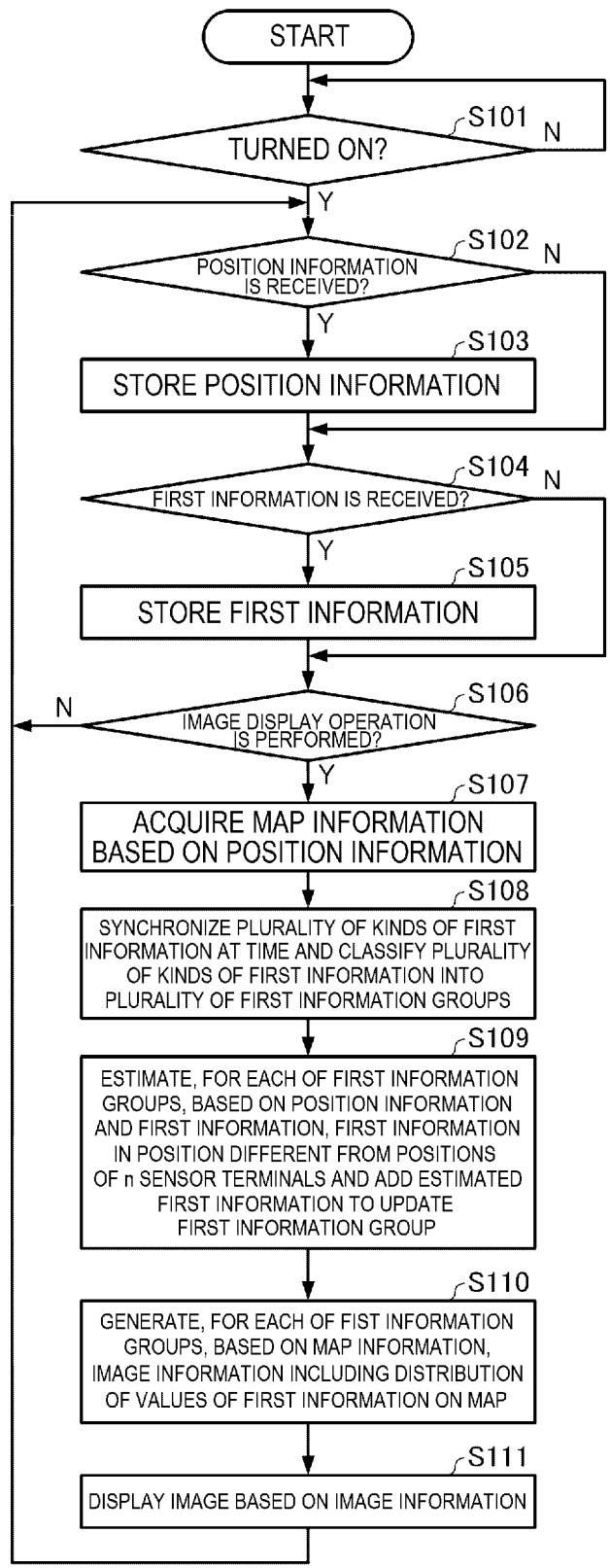
FIG. 10 is a flowchart showing an example of a procedure of the operation of the display device.

FIG. 10 is a flowchart showing an example of a procedure of the operation of the display device 30 as an example of a display method in this embodiment. In the flowchart of FIG. 10, the order of steps may be changed or steps may be added as appropriate.

In the example shown in FIG. 10, after the display device 30 is turned on (Yin step S101), when receiving position information from the sensor terminal 10 (Y in step S102), the display device 30 causes the storage 34 to store the received position information (step S103).

When receiving first information from the sensor terminal 10 (Y in step S104), the display device 30 causes the storage 34 to store the received first information (step S105).

The display device 30 performs the processing in steps S102 to S105 until operation for instructing image display is performed by the user (N in step S106).

When the operation for instructing image display is performed by the user (Y in step S106), first, the display device 30 acquires, based on the position information that the display device 30 causes the storage 34 to store in step S103, from the map server 40, map information including the region where the structure in which the sensor terminal 10 is provided is located (step S107).

Subsequently, the display device 30 synchronizes a plurality of kinds of first information, which the display device 30 causes the storage 34 to store in step S105, at time and classifies the plurality of kinds of first information into a plurality of first information groups (step S108).

Subsequently, the display device 30 estimates, for the first information groups classified in step S108, based on the position information and the first information, first information in a position different from the positions of the n sensor terminals 10 and adds the estimated first information to update the first information group (step S109).

Subsequently, the display device 30 generates, for the first information groups updated in step S109, based on the map information acquired in step S107, image information including a distribution of values of the first information on the map (step S110). In step S110, the display device 30 may generate image information including a propagation state of seismic intensity at the ground surface or under the ground as the distribution of the values of the first information or may generate image information including the distribution of the values of the first information and a propagation state of seismic intensity at the ground surface. Step S110 is an example of an "image information generating step".

Subsequently, the display device 30 displays, on the display 38, an image based on the image information generated in step S110 (step S111) and repeatedly performs the processing in step S102 and subsequent steps. Step S111 is an example of a "displaying step".

1-4. Display Example of an Image

As explained above, with the display system 1 in this embodiment, the user can observe, for one structure, vibration of the entire structure and the influence of the vibration on the structure taking into account a situation of a region where the structure is located. The user can observe, for a plurality of structures, vibration of the respective entire structures and the influence of the vibration on the structures overlooking a situation of a region where the plurality of structures are located.

FIGS. 11 to 14 are diagrams showing examples of images displayed on the display 38 of the display device 30. The user can observe, based on these images, for one structure or a plurality of structures, vibration of the entire structure(s) and the influence of the vibration on the structure(s). The user can select first information and a type of an image. The images shown in FIGS. 11 to 14 are displayed on the display 38 according to the election of the user. The images shown in FIGS. 11 to 14 are, for example, images displayable when a structure in which each of the n sensor terminals 10 is provided is a building.

Figure 11:
FIG. 11 is a diagram showing an example of an image displayed on the display of the display device.

An image 200 shown in FIG. 11 includes a two-dimensional image 201, a stop button image 202, a play button image 203, a rewind button image 204, a fast-feed button image 205, a time bar image 206, and a depth bar image 207.

The two-dimensional image 201 is an image including a propagation state of seismic intensity at the ground surface or under the ground as a distribution of values of first information on a map. The two-dimensional image 201 is an image displayed when the user selects information concerning seismic intensity as the first information.

The user can select depth by operating a cursor of the depth bar image 207. The two-dimensional image 201 including a map and a propagation state of seismic intensity at the ground surface or under the ground corresponding to the selected depth is displayed. Depth 0 m is equivalent to the ground surface. Depth larger than 0 m is equivalent to the underground.

When the user presses the play button image 203, the cursor of the time bar image 206 moves and time advances. The two-dimensional image 201 serving as a moving image is displayed. In the two-dimensional image 201 serving as the moving image, a front line to which seismic intensity is propagated moves in the order of w1, w2, w3, and w4. For example, when an earthquake with seismic intensity of 4 occurs, w1, w2, w3, and w4 represent a front line to which seismic intensity of 4 is propagated.

When the user presses the fast-feed button image 205, the two-dimensional image 201 serving as a moving image of fast feed is displayed. When the user presses the rewind button image 204, the two-dimensional image 201 serving as a moving image of rewind is displayed.

When the user presses the stop button image 202, the cursor of the time bar image 206 stops and the two-dimensional image 201 serving as a still image at time designated by the cursor is displayed. In the two-dimensional image 201 serving as the still image, w2 represents a front line to which seismic intensity is propagated.

For example, when an earthquake occurs, the user can grasp, based on the image 200, a situation in which seismic intensity is propagated on the ground surface or under the ground and perform, for example, an analysis of a cause of damage.

Figure 12:
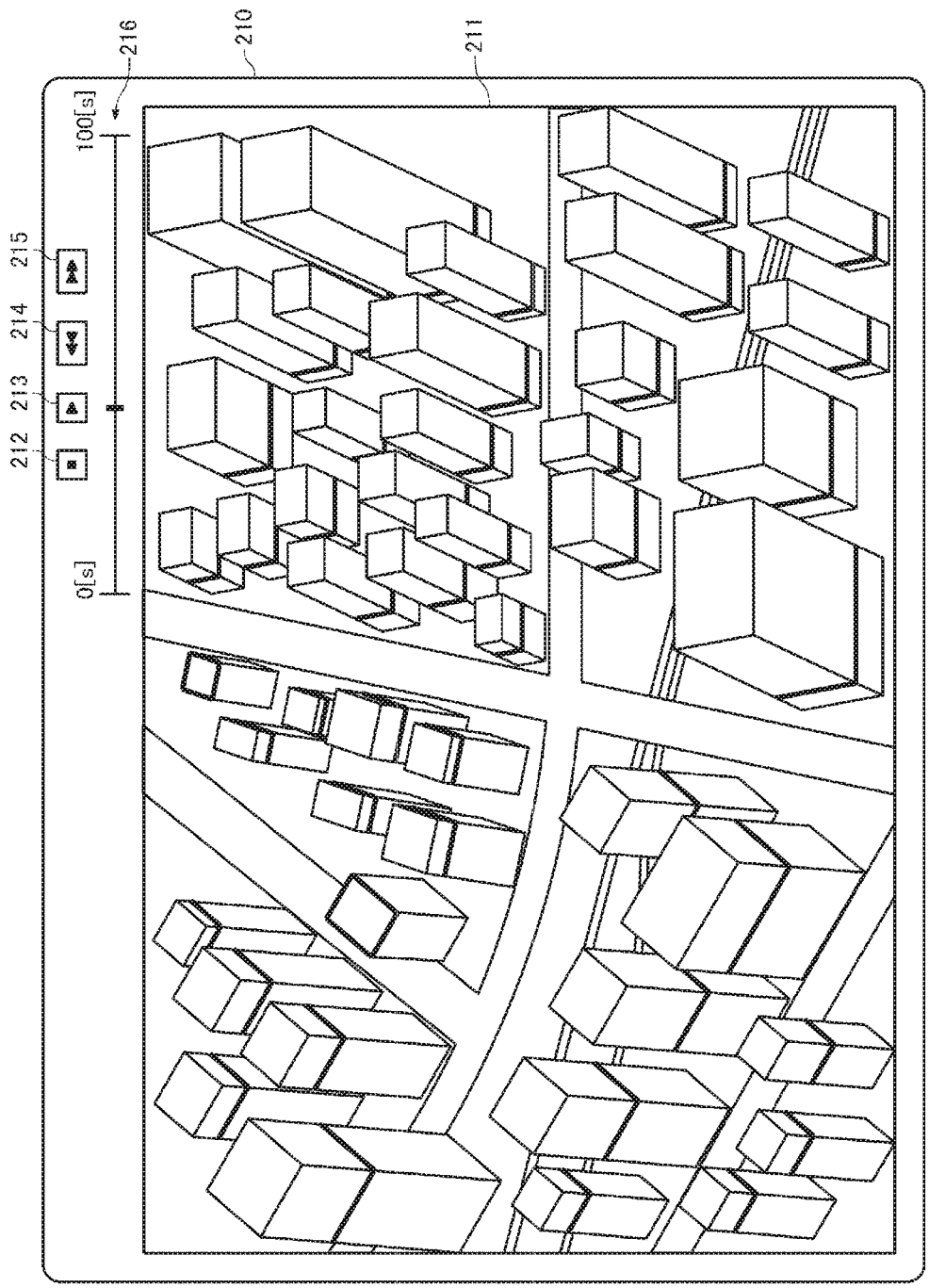
FIG. 12 is a diagram showing an example of an image displayed on the display of the display device.
Figure 13:
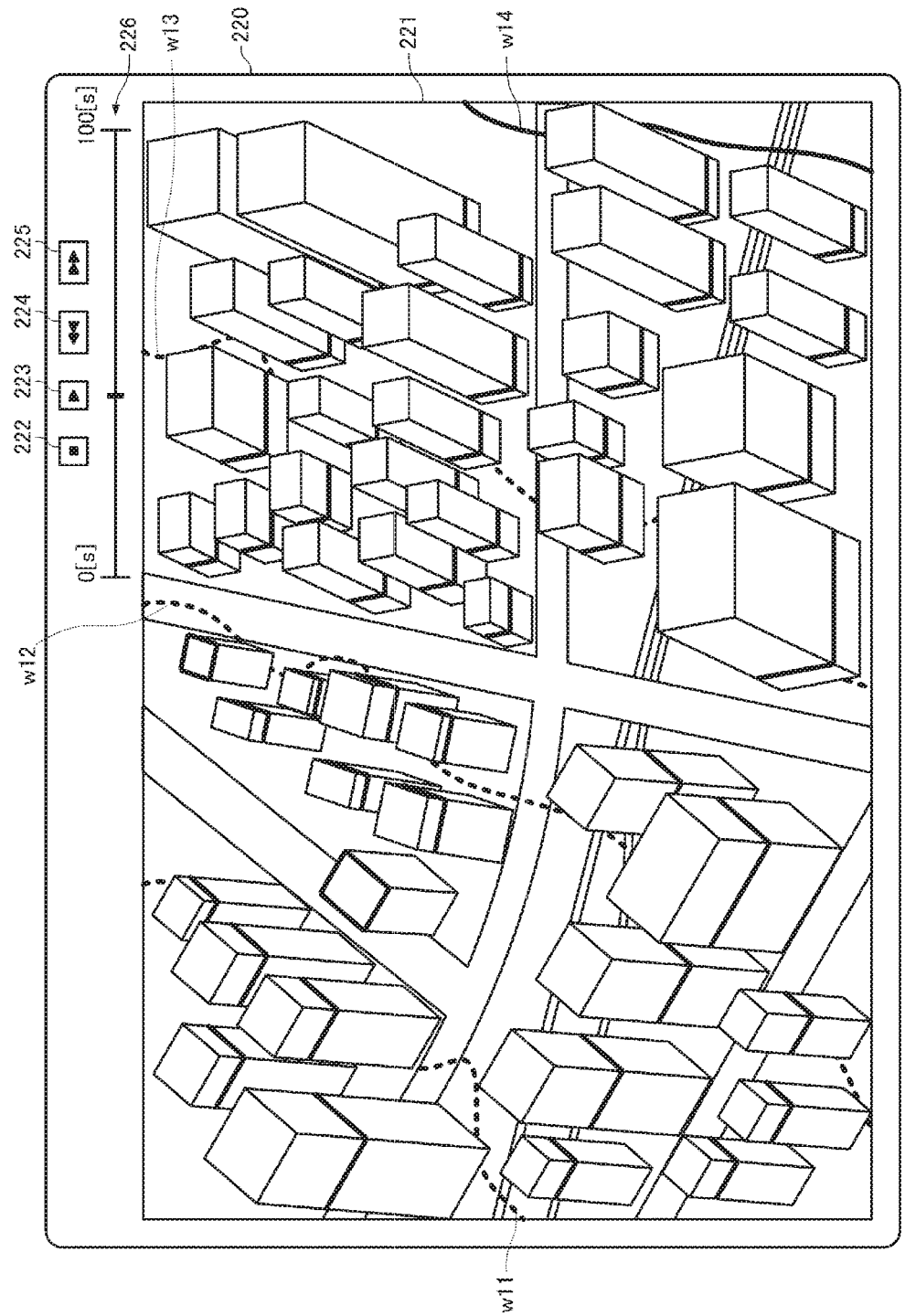
FIG. 13 is a diagram showing an example of an image displayed on the display of the display device.

An image 201 shown in FIG. 12 includes a three-dimensional image 211, a stop button image 212, a play button image 213, a rewind button image 214, a fast-feed button image 215, and a time bar image 216.

The three-dimensional image 211 is an image overlooking a city and is an image including a propagation state of seismic intensity to a building as a distribution of values of first information on a map. The three-dimensional image 211 is an image displayed when the user selects information concerning seismic intensity as the first information.

When the user presses the play button image 213, a cursor of the time bar image 216 moves and time advances and the three-dimensional image 211 serving as a moving image is displayed. In the three-dimensional image 211 serving as the moving image, a thick line indicating a front line to which seismic intensity is propagated moves upward concerning buildings. For example, when an earthquake with seismic intensity of 4 occurs, thick lines of the buildings represent a front line to which seismic intensity of 4 is propagated. Alternatively, the three-dimensional image 211 may be an image in which a region to which the seismic intensity is propagated and a region to which the seismic intensity is not propagated are distinguished by colors.

When the user presses the fast-feed button image 215, the three-dimensional image 211 serving as a moving image of fast feed is displayed. When the user presses the rewind button image 214, the three-dimensional image 211 serving as a moving image of rewind is displayed.

When the user presses the stop button image 212, the cursor of the time bar image 216 stops. The three-dimensional image 211 serving as a still image at time designated by the cursor is displayed.

For example, when an earthquake occurs, the user can grasp, based on the image 200, a state of propagation of seismic intensity through the buildings and perform, for example, an analysis of damage to the buildings and a cause of the damage.

An image 220 shown in FIG. 3 includes a three-dimensional image 221, a stop button image 222, a play button image 223, a rewind button image 224, a fast-feed button image 225, and a time bar image 226.

The three-dimensional image 221 is an image overlooking a city and is an image including a propagation state of seismic intensity to a building serving as a distribution of values of first information and a propagation state of seismic intensity at the ground surface. The three-dimensional image 221 is an image displayed when the user selects information concerning the seismic intensity as the first information and instructs display of the propagation state of the seismic intensity at the ground surface.

When the user presses the play button image 223, a cursor of the time bar image 226 moves and time advances and the three-dimensional image 221 serving as a moving image is displayed. In the three-dimensional image 221 serving as the moving image, a thick line indicating a front line to which seismic intensity is propagated concerning buildings moves upward. The front line to which the seismic intensity is propagated on the ground surface moves in the order of w11, w12, w13, and w14. For example, when an earthquake with seismic intensity of 4 occurs, thick lines of the buildings represent a front line to which seismic intensity of 4 is propagated and w11, w12, w13, and w14 represent a front line to which the seismic intensity of 4 is propagated on the ground surface. Alternatively, the three-dimensional image 221 may be an image in which a region to which the seismic intensity is propagated and a region to which the seismic intensity is not propagated are distinguished by colors.

When the user presses the fast-feed button image 225, the three-dimensional image 221 serving as a moving image of fast feed is displayed. When the user presses the rewind button image 224, the three-dimensional image 221 serving as a moving image of rewind is displayed.

When the user presses the stop button image 222, the cursor of the time bar image 226 stops. The three-dimensional image 221 serving as a still image at time designated by the cursor is displayed. In the three-dimensional image 221 serving as the still image, w14 represents a front line to which seismic intensity is propagated on the ground surface.

For example, when an earthquake occurs, the user can grasp, based on the image 200, a state in which seismic intensity is propagated on buildings and the ground surface and can perform, for example, an analysis of damage to the buildings and a cause of the damage.

Figure 14:
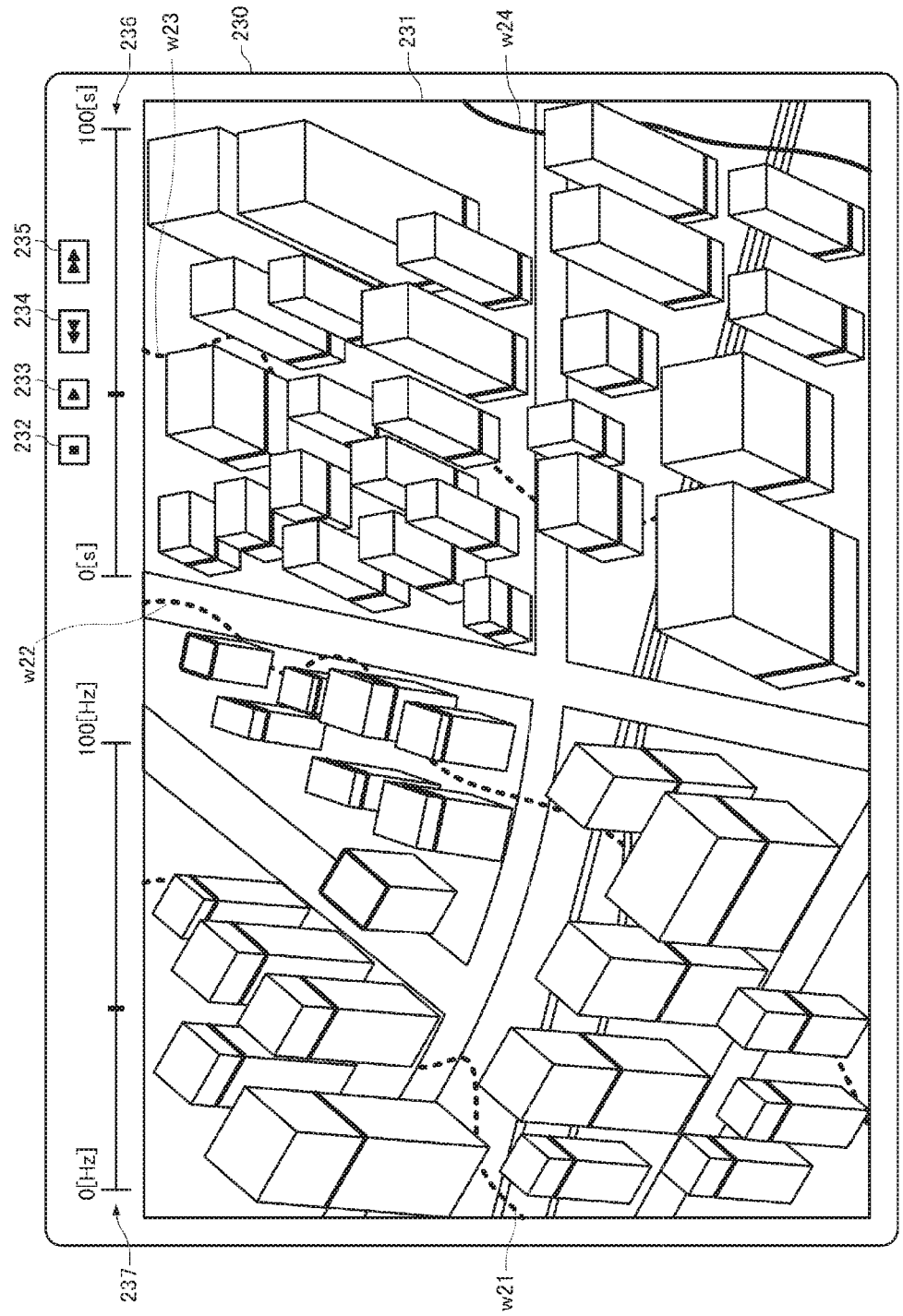
FIG. 14 is a diagram showing an example of an image displayed on the display of the display device.

An image 230 shown in FIG. 14 includes a three-dimensional image 231, a stop button image 232, a play button image 233, a rewind button image 234, a fast-feed button image 235, a time bar image 236, and a frequency bar image 237.

The three-dimensional image 231 is an image overlooking a city and is an image including a propagation state of maximum intensity of vibration to a building serving as a distribution of values of first information and a propagation state of seismic intensity at the ground surface. The three-dimensional image 231 is an image displayed when the user selects information concerning a frequency characteristic of the vibration as the first information and instructs display of the propagation state of the seismic intensity at the ground surface.

The user can select, by operating a cursor of the frequency bar image 237, a frequency of vibration to be displayed. The three-dimensional image 231 including a propagation state of maximum intensity of vibration of the selected frequency to the building is displayed.

When the user presses the play button image 233, a cursor of the time bar image 236 moves and time advances and the three-dimensional image 231 serving as a moving image is displayed. In the three-dimensional image 231 serving as the moving image, a thick line indicating a front line to which maximum intensity of vibration of a frequency selected concerning buildings is propagated moves upward. A front line to which seismic intensity is propagated on the ground surface moves in the order of w21, w22, w23, and w24. For example, when an earthquake with seismic intensity of 4 occurs, thick lines of the buildings represent a front line to which maximum intensity of vibration generated by the earthquake is propagated and w21, w22, w23, and w24 represent a front line to which seismic intensity of 4 of the vibration is propagated on the ground surface. Alternatively, the three-dimensional image 231 may be an image in which a region to which maximum intensity or seismic intensity of vibration is propagated and a region to which the maximum intensity and the seismic intensity of the vibration are not propagated are distinguished by color.

When the user presses the fast-feed button image 235, the three-dimensional image 231 serving as a moving image of fast feed is displayed. When the user presses the rewind button image 234, the three-dimensional image 231 serving as a moving image of rewind is displayed.

When the user presses the stop button image 232, the cursor of the time bar image 236 stops and the three-dimensional image 231 serving as a still image at time designated by the cursor is displayed. In the three-dimensional image 231 serving as the still image, w24 represents a front line to which seismic intensity is propagated on the ground surface.

For example, when an earthquake occurs, the user can grasp, based on the image 200, a situation in which vibrations of frequencies are propagated in the buildings and in which seismic intensity is propagated on the ground surface and perform, for example, an analysis of damage to the buildings and a cause of the damage.

An image displayed on the display 38 is not limited to the images shown in FIGS. 11 to 14. For example, the image may be an image in which interlayer displacements, interlayer deformation angles, and distortions, or fatigue degrees of the buildings are displayed by line segments, color coding, or the like.

1-5. Effects

As explained above, in the display system 1 in the first embodiment, each of the plurality of sensor terminals 10 estimates first information based on first measurement data obtained by measuring a physical quantity generated by vibration and transmits the estimated first information to the display device 30. The display device 30 synchronizes a plurality of kinds of first information received from each of the plurality of sensor terminals 10 at time and classifies the plurality of kinds of first information into a plurality of first information groups and estimates, for each of the plurality of first information groups, first information in a position different from the positions of the plurality of sensor terminals 10 and updates the first information group. The display device 30 can generate, for each of the updated plurality of first information groups, based on map information, image information including a distribution of values of the first information on a map and display an image based on the image information, for example, the images shown in FIGS. 11 and 12. Alternatively, the display device 30 can generate, for each of the updated plurality of first information groups, based on the map information, image information including the distribution of the values of the first information on the map and a propagation state of seismic intensity at the ground surface, and display an image based on the image information, for example, the images shown in FIGS. 13 and 14. Therefore, with the display system 1 in the first embodiment, the user can observe, concerning vibration of an entire structure and the influence of the vibration on the structure, a situation of a region where the structure is located. For example, when an earthquake occurs, the user can grasp, based on the image displayed by the display device 30, for example, a situation in which the seismic intensity is propagated and perform, for example, an analysis of damage to the structure and a cause of the damage. In particular, the display device 30 displays a moving image or a still image at designated time, whereby the user can perform a precise analysis or the like.

2. Second Embodiment

Concerning the display system 1 in a second embodiment, the same components as the components in the first embodiment are denoted by the same reference numerals and signs and content different from the content of the first embodiment is mainly explained. Redundant explanation of the first embodiment is simplified or omitted. As in the first embodiment, the display system 1 in the second embodiment includes the n sensor terminals 10 and the display device 30. The configuration of the display device 30 is the same as the configuration in the first embodiment. The configuration of the sensor terminal 10 is different from the configuration in the first embodiment.

Figure 15:
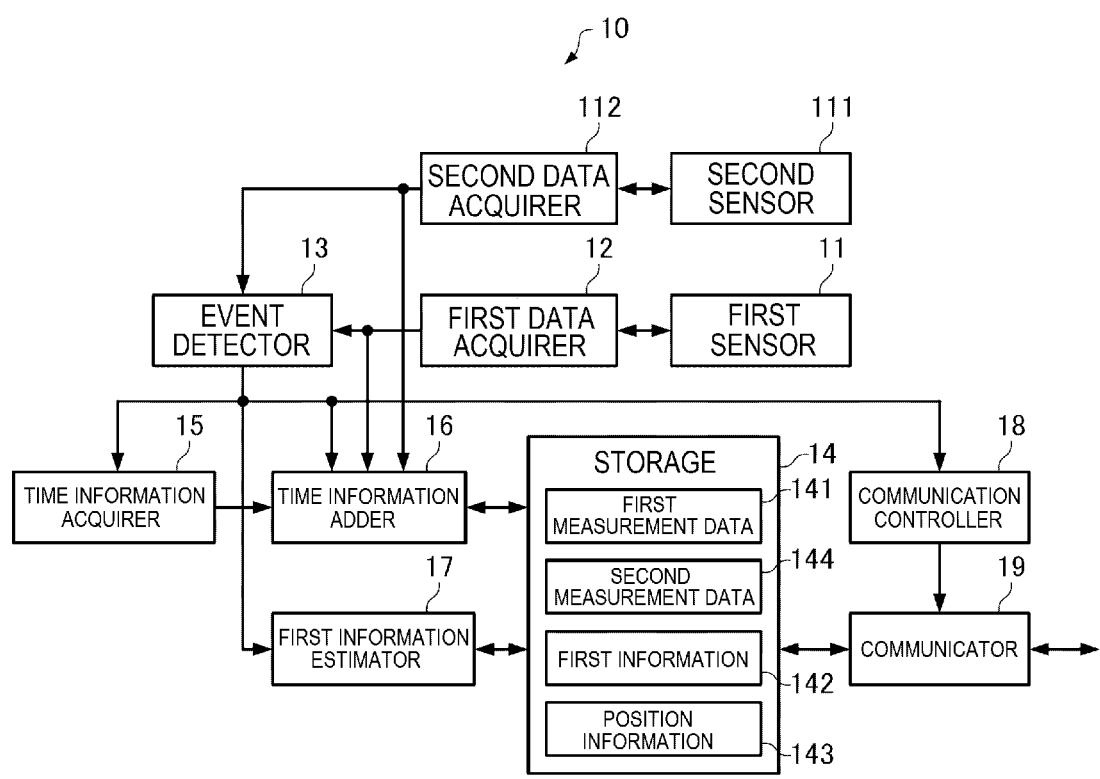
FIG. 15 is a diagram showing an example of functional blocks of a sensor terminal in a display system in a second embodiment.

FIG. 15 is a diagram showing an example of functional blocks of the sensor terminal 10 in the display system 1 in the second embodiment. As shown in FIG. 15, as in the first embodiment, the sensor terminal 10 in the second embodiment includes the first sensor 11, the first data acquirer 12, the event detector 13, the storage 14, the time information acquirer 15, the time information adder 16, the first information estimator 17, the communication controller 18, and the communicator 19 and further includes a second sensor 111 and a second data acquirer 112.

The operations of the first sensor 11, the first data acquirer 12, the time information acquirer 15, the communication controller 18, and the communicator 19 are the same as the operations in the first embodiment. Therefore, explanations of the operations are omitted.

The second sensor 111 measures a physical quantity generated by vibration of a structure in which the sensor terminal 10 is provided and outputs second measurement data. In this embodiment, for example, the first sensor 11 may be an acceleration sensor that measures acceleration as the physical quantity generated by the vibration. The second sensor 111 may be an angular velocity sensor that measures angular velocity as the physical quantity generated by the vibration.

The second data acquirer 112 periodically acquires the second measurement data from the second sensor 111 and outputs the second measurement data to the event detector 13.

The event detector 13 generates an event signal when an amount of change of the first measurement data in a predetermined period exceeds a predetermined first threshold or when an amount of change of the second measurement data in the predetermined period exceeds a predetermined second threshold. When large vibration is suddenly applied to the first sensor 11 and the second sensor 111, for example, when an earthquake occurs, at least one of the first measurement data and the second measurement data suddenly changes and the event detector 13 generates the event signal. The event detector 13 may generate the event signal when large vibration is detected by a mechanism different from the first sensor 11 and the second sensor 111 or may generate the event signal based on a signal input from the outside of the sensor terminal 10 in association with the large vibration. The second data acquirer 112 continues the acquisition of the second measurement data even after the event signal is generated.

After the generation of the event signal, the time information adder 16 adds the time information acquired by the time information acquirer 15 to the first measurement data acquired by the first data acquirer 12 and causes the storage 14 to sequentially store the first measurement data 141 added with the time information. After the generation of the event signal, the time information adder 16 adds the time information acquired by the time information acquirer 15 to the second measurement data acquired by the second data acquirer 112 and causes the storage 14 to sequentially store second measurement data 144 added with the time information. Consequently, the storage 14 accumulates the first measurement data 141 added with the time information and the second measurement data 144 added with the time information.

After the generation of the event signal, the first time estimator 17 estimates first information based on the first measurement data 141 and the second measurement data 144 accumulated in the storage 14 and causes the storage 14 to store the estimated first information 142.

The storage 14 stores the first measurement data 141, the second measurement data 144, the first information 142, and the position information 143 of the sensor terminal 10.

Figure 16:
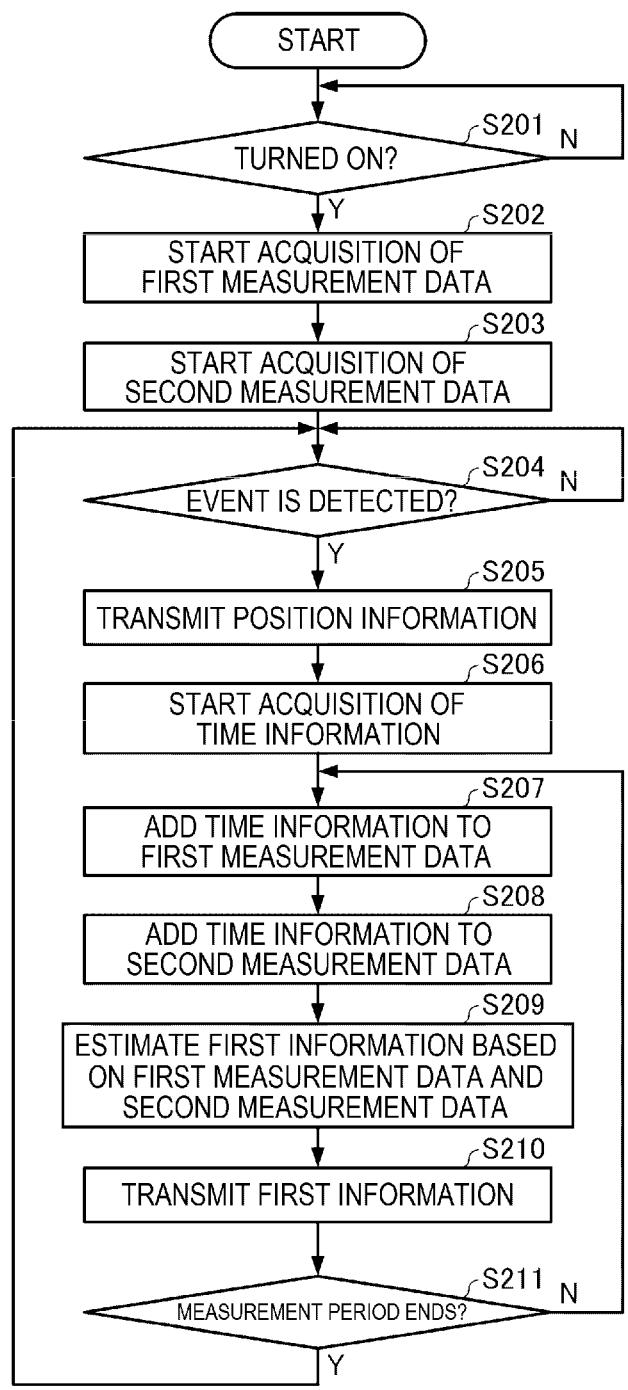
FIG. 16 is a flowchart showing a procedure of the operation of the sensor terminal in the display system in the second embodiment.

FIG. 16 is a flowchart showing an example of a procedure of the operation of the sensor terminal 10. In the flowchart shown in FIG. 16, the order of steps may be changed or steps may be added as appropriate.

In the example shown in FIG. 16, when the sensor terminal 10 is turned on (Y in step S201), the sensor terminal 10 starts acquisition of first measurement data (step S202). The sensor terminal 10 starts acquisition of second measurement data (step S203).

Subsequently, when detecting an event (Y in step S204), the sensor terminal 10 transmits position information to the display device 30 (step S205).

Subsequently, the sensor terminal 10 starts acquisition of time information (step S206).

Subsequently, the sensor terminal 10 adds the time information to the acquired first measurement data (step S207). The sensor terminal 10 adds the time information to the acquired second measurement data (step S208).

Subsequently, the sensor terminal 10 estimates first information based on the first measurement data and the second measurement data (step S209).

Subsequently, the sensor terminal 10 transmits the first information to the display device 30 (step S210).

The sensor terminal 10 repeatedly performs the processing in step S207 and subsequent steps until a measurement period ends (N in step S211). When the measurement period ends (Y in step S211), the sensor terminal 10 performs the processing in step S204 and subsequent steps again.

The display system 1 in the second embodiment explained above obtains the same effects as the effects in the first embodiment. Further, in the display system 1 in the second embodiment, each of the plurality of sensor terminals 10 can more accurately estimate first information based on the first measurement data and the second measurement data obtained by measuring the physical quantity generated by the vibration. Therefore, with the display system 1 in the second embodiment, for example, when an earthquake occurs, the user can grasp, based on an image displayed by the display device 30, for example, a more accurate situation in which seismic intensity is propagated and perform, for example, a more accurate analysis of damage to a structure and a cause of the damage.

3. Third Embodiment

Concerning the display system 1 in a third embodiment, the same components as the components in the first embodiment are denoted by the same reference numerals and signs and content different from the content of the first embodiment is mainly explained. Redundant explanation of the first embodiment is omitted.

Figure 17:
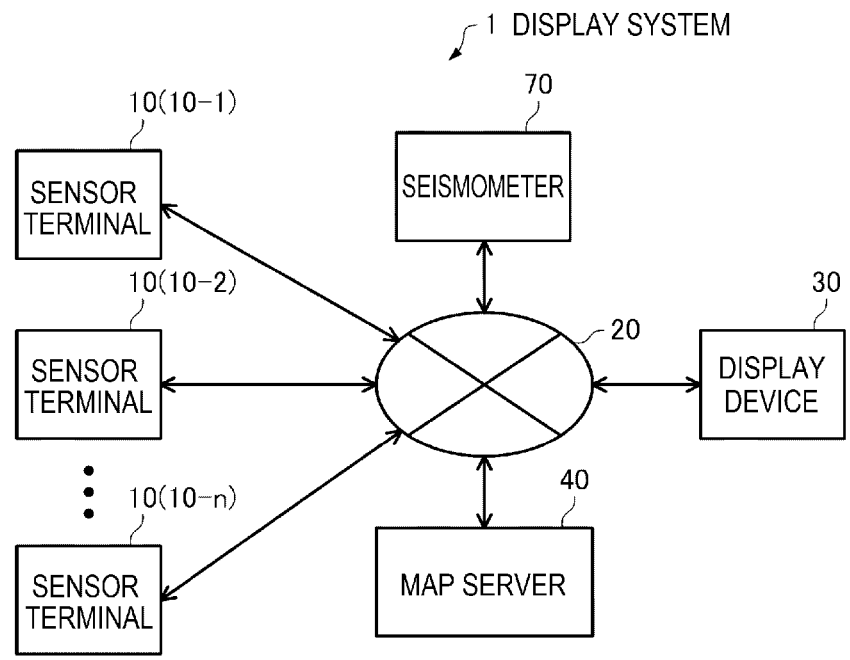
FIG. 17 is a diagram showing the configuration of a display system in a third embodiment.

FIG. 17 is a diagram showing the configuration of the display system 1 in the third embodiment. As shown in FIG. 17, the display system 1 in the third embodiment includes all the components of the display system 1 in the first embodiment shown in FIG. 1 and further includes a seismometer 70.

The function and the configuration of the sensor terminal 10 are the same as the function and the configuration in the first embodiment. Therefore, explanation of the function and the configuration is omitted.

The seismometer 70 is provided at the ground surface or under the ground. The seismometer 70 measures seismic intensity of an earthquake and transmits seismic intensity information including a value of the measured seismic intensity and measurement time to the display device 30 via the communication network 20.

As in the first embodiment, the display device 30 receives the first information from each of the n sensor terminals 10 via the communication network 20. The display device 30 acquires map information from the map server 40. Further, the display device 30 receives seismic intensity information from the seismometer 70 via the communication network 20. The display device 30 generates, based on the first information, the seismic intensity information, and the map information, image information including a distribution of values of the first information on a map and displays an image based on the generated image information on a not-shown display.

Figure 18:
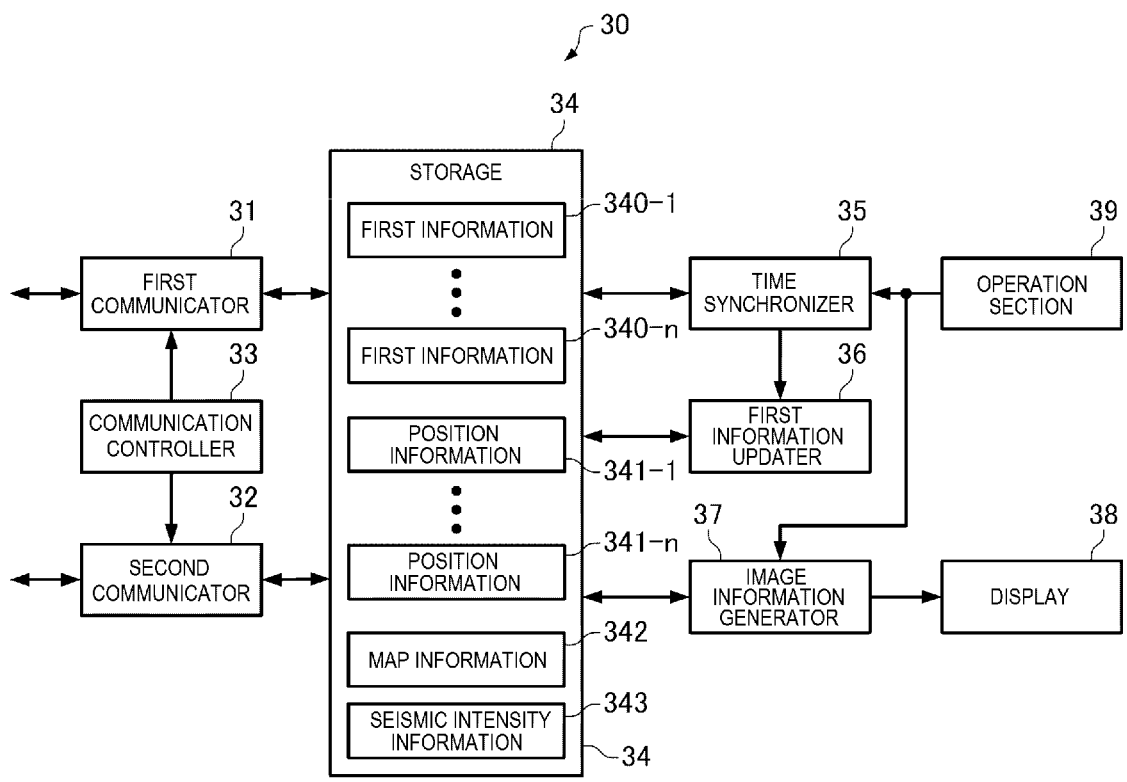
FIG. 18 is a diagram showing an example of functional blocks of a display device in the display system in the third embodiment.

FIG. 18 is a diagram showing an example of functional blocks of the display device 30 in the display system 1 in the third embodiment. As shown in FIG. 18, as in the first embodiment, the display device 30 in the third embodiment includes the first communicator 31, the second communicator 32, the communication controller 33, the storage 34, the time synchronizer 35, the first information updater 36, the image information generator 37, the display 38, and the operation section 39.

The operations of the first communicator 31, the time synchronizer 35, the image information generator 37, the display 38, and the operation section 39 are the same as the operations in the first embodiment. Therefore, explanation of the operations is omitted.

The communication controller 33 controls the operation of the first communicator 31 and the operation of the second communicator 32. Specifically, the communication controller 33 controls the first communicator 31 to receive first information added with time information and position information from each of the n sensor terminals 10. The communication controller 33 controls the second communicator 32 to receive, from the map server 40, map information including the region where the structure in which the n sensor terminals 10 are provided is located. Further, the communication controller 33 controls the second communicator 32 to receive seismic intensity information from the seismometer 70.

The second communicator 32 performs communication with the map server 40 and the seismometer 70 according to the control by the communication controller 33. In particular, in this embodiment, the second communicator 32 functions as a map information acquirer and also functions as a seismic intensity information acquirer that receives seismic intensity information 343 from the seismometer 70 and causes the storage 34 to store the seismic intensity information 343.

The first information updater 36 estimates, for each of a plurality of first information groups classified by the time synchronizer 35, based on the position information 341-1 to 341-n stored in the storage 34 and the first information included in the first information group and the seismic intensity information 343, first information in a position different from the positions of the n sensor terminals 10 and adds the estimated first information to update the first information group. For example, the first information updater 36 may calculate, for each of the plurality of first information groups, based on the position information 341-1 to 341-n and the first information included in the first information group, first information in a position different from the positions of the n sensor terminals 10 and correct the calculated first information based on the seismic intensity information 343 to thereby estimate first information in a position different from the positions of the n sensor terminals 10.

Figure 19:
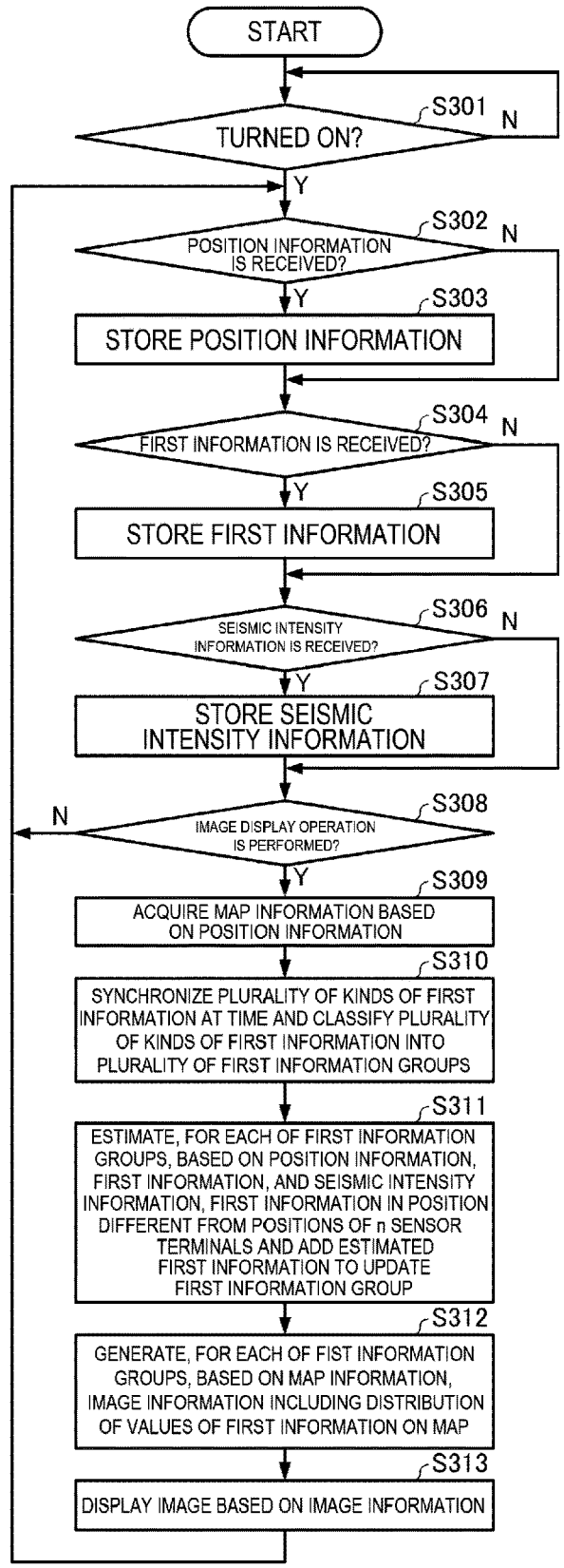
FIG. 19 is a flowchart showing an example of a procedure of the operation of the display device in the display system in the third embodiment.

FIG. 19 is a flowchart showing an example of a procedure of the operation of the display device 30 as an example of a display method in this embodiment. In the flowchart of FIG. 19, the order of steps may be changed or steps may be added as appropriate.

In the example shown in FIG. 19, after the display device 30 is turned on (Yin step S301), when receiving position information from the sensor terminal 10 (Y in step S302), the display device 30 causes the storage 34 to store the received position information (step S303).

When receiving first information from the sensor terminal 10 (Y in step S304), the display device 30 causes the storage 34 to store the received first information (step S305).

When receiving seismic intensity information from the seismometer 70 (Y in step S306), the display device 30 causes the storage 34 to store the received seismic intensity information (step S307).

The display device 30 performs the processing in steps S302 to S307 until operation for instructing image display is performed by the user (N in step S308).

When the operation for instructing image display is performed by the user (Y in step S308), first, the display device 30 acquires, based on the position information that the display device 30 causes the storage 34 to store in step S303, from the map server 40, map information including the region where the structure in which the sensor terminal 10 is provided is located (step S309).

Subsequently, the display device 30 synchronizes a plurality of kinds of first information, which the display device 30 causes the storage 34 to store in step S305, at time and classifies the plurality of kinds of first information into a plurality of first information groups (step S310).

Subsequently, the display device 30 estimates, for the first information groups classified in step S310, based on the position information, the first information, and the seismic intensity information that the display device 30 causes the storage 34 to store in step S307, first information in a position different from the positions of the n sensor terminals 10 and adds the estimated first information to update the first information group (step S311).

Subsequently, the display device 30 generates, for the first information groups updated in step S311, based on the map information acquired in step S309, image information including a distribution of values of the first information on the map (step S312). Step S312 is an example of an "image information generating step".

Subsequently, the display device 30 displays, on the display 38, an image based on the image information generated in step S312 (step S313) and repeatedly performs the processing in step S302 and subsequent steps. Step S313 is an example of a "displaying step".

The display system 1 in the third embodiment explained above obtains the same effects as the effects in the first embodiment. Further, in the display system 1 in the third embodiment, the display device 30 can more accurately estimate, for each of the plurality of first information groups, further based on the seismic intensity information 343 in addition to the position information of the n sensor terminals 10 and the first information included in the first information group, first information in a position different from the positions of the n sensor terminals 10. Therefore, with the display system 1 in the third embodiment, for example, when an earthquake occurs, the user can grasp, based on an image displayed by the display device 30, for example, a more accurate situation in which seismic intensity is propagated and perform, for example, a more accurate analysis of damage to a structure and a cause of the damage.

4. Modification

In the embodiments, the example is explained in which the sensor terminal 10 is set in the building. However, a structure to which the sensor terminal 10 is attached is not limited to the building and may be, for example, a transmission line tower, a wind power generator, and an electric bulletin board on a road.

The present disclosure is not limited to the embodiments. Various modified implementations are possible within a range of the gist of the present disclosure.

The embodiments and the modifications explained above are examples. The present disclosure is not limited to these embodiments and modifications. For example, the embodiments and the modifications can be combined as appropriate.

The present disclosure includes substantially the same configurations as the configurations explained in the embodiments, for example, configurations having the same functions, the same methods, and the same results or configurations having the same objects and the same effects. The present disclosure includes configurations obtained by substituting unessential portions of the configurations explained in the embodiments. The present disclosure includes configurations that obtain the same action effects as the action effects of the configurations explained in the embodiments or configurations that achieve the same objects as the objects of the configurations explained in the embodiments. The present disclosure includes configurations obtained by adding publicly-known techniques to the configurations explained in the embodiments.

What is claimed is:

1. A display system comprising:
 a plurality of sensor terminals provided in at least one structure; and
 a display device, wherein
 each of the plurality of sensor terminals includes:
  a first sensor configured to measure a physical quantity generated by vibration and output first measurement data;
  a storage configured to store the first measurement data;
  a first information estimator configured to estimate first information based on the first measurement data accumulated in the storage;
  a time-information acquirer configured to acquire time information; and
  a transmitter configured to transmit the first information added with the time information to the display device, and
 the display device includes:
  a receiver configured to receive the first information from each of the plurality of sensor terminals;
  a time synchronizer configured to synchronize a received plurality of kinds of the first information at time and classify the plurality of kinds of first information into a plurality of first information groups;
  a position-information acquirer configured to acquire position information of the plurality of sensor terminals;
  a map information acquirer configured to acquire map information including a region where the structure is located;
  a first information updater configured to estimate, for each of the plurality of first information groups, based on the position information and the first information included in the first information group, the first information in a position different from positions of the plurality of sensor terminals and add the estimated first information to update the first information group;
  an image information generator configured to generate, for each of the updated plurality of first information groups, based on the map information, image information including a distribution of values of the first information at ground surface or underground on a map; and
  a display configured to display an image based on the image information, wherein the image includes a front line of propagation of a seismic wave.

2. The display system according to claim 1, wherein the transmitter transmits the position information to the display device.

3. The display system according to claim 1, wherein the first sensor is an acceleration sensor.

4. The display system according to claim 3, wherein
 each of the plurality of sensor terminals includes a second sensor configured to measure a physical quantity generated by vibration and output second measurement data,
 the second sensor is an angular velocity sensor,
 the storage accumulates the second measurement data, and
 the first information estimator estimates the first information based on the accumulated first measurement data and the accumulated second measurement data.

5. The display system according to claim 1, wherein the image is a moving image.

6. The display system according to claim 1, wherein
at least one of the plurality of sensor terminals is provided at a ground surface or under a ground,
the first information updater estimates, for each of the plurality of first information groups, seismic intensity at the ground surface based on the position information of the sensor terminal provided at the ground surface or under the ground and the first information transmitted from the sensor terminal and adds information concerning the estimated seismic intensity to update the first information group, and
the image information generator generates, for each of the updated plurality of first information groups, the image information including the distribution of values of the first information and a propagation state of the seismic intensity at the ground surface.

7. The display system according to claim 1, wherein
at least one of the plurality of sensor terminals is provided at a ground surface or under a ground,
the first information includes information concerning seismic intensity,
the first information updater estimates, for each of the plurality of first information groups, seismic intensity at the ground surface or under the ground based on the position information of the sensor terminal provided at the ground surface or under the ground and the first information transmitted from the sensor terminal and adds information concerning the estimated seismic intensity to update the first information group, and
the image information generator generates, for each of the updated plurality of first information groups, the image information including a propagation state of the seismic intensity at the ground surface or under the ground as the distribution of values of the first information.

8. The display system according to claim 1, wherein the first information updater estimates, for each of the plurality of first information groups, based on the position information, the first information included in the first information group, and seismic intensity measured by a seismometer, the first information in a position different from positions of the plurality of sensor terminals.

9. The display system according to claim 1, wherein the image is a still image at a designated time.

10. A display device comprising:
an image information generator configured to generate, based on first information based on a physical quantity generated by vibration transmitted from each of a plurality of sensor terminals provided in at least one structure, image information including a distribution of values of the first information at ground surface or underground on a map; and
a display configured to display an image based on the image information, wherein the image includes a front line of propagation of a seismic wave.

11. The display device according to claim 10, wherein the image is a moving image or a still image at a designated time.

12. The display device according to claim 10, wherein
at least one of the plurality of sensor terminals is provided at a ground surface or under a ground, and
the image information generator generates the image information including the distribution of the values of the first information and a propagation state of seismic intensity at a ground surface.

13. The display device according to claim 10, wherein
at least one of the plurality of sensor terminals is provided at a ground surface or under a ground,
the first information includes information concerning seismic intensity, and
the image information generator generates the image information including a propagation state of seismic intensity at a ground surface or under a ground as the distribution of the values of the first information.

14. The display device according to claim 10, wherein the image information generator generates the image information based on the first information and seismic intensity measured by a seismometer.

15. A display method comprising:
an image-information generating step of generating, based on first information based on a physical quantity generated by vibration transmitted from each of a plurality of sensor terminals provided in a structure, image information including a distribution of values of the first information at ground surface or underground on a map; and
a displaying step of displaying an image based on the image information, wherein the image includes a front line of propagation of a seismic wave.

16. The display method according to claim 15, wherein the image is a moving image or a still image at a designated time.

17. The display method according to claim 15, wherein
at least one of the plurality of sensor terminals is provided at a ground surface or under a ground, and
in the image-information generating step, the image information including the distribution of the values of the first information and a propagation state of seismic intensity at a ground surface is generated.

18. The display method according to claim 15, wherein
at least one of the plurality of sensor terminals is provided at a ground surface or under a ground,
the first information includes information concerning seismic intensity, and
in the image-information generating step, the image information including a propagation state of the seismic intensity at the ground surface or under the ground as the distribution of the values of the first information is generated.

19. The display method according to claim 15, wherein, in the image-information generating step, the image information is generated based on the first information and seismic intensity measured by a seismometer.

* * * * *